(12) United States Patent  (10) Patent No.: US 8,380,580 B2
Kirian et al.  (45) Date of Patent: Feb. 19, 2013

(54) SYSTEM AND METHOD FOR MANAGING A PLURALITY OF TIRES

(75) Inventors: Nathan J. Kirian, Simpsonville, SC (US); Christopher Michael Stokes, Gastonia, NC (US)

(73) Assignee: Tire Centers, Inc, Duncan, SC (US)

( * ) Notice: Subject to any disclaimer, the term of this patent is extended or adjusted under 35 U.S.C. 154(b) by 0 days.

(21) Appl. No.: 13/346,067

(22) Filed: Jan. 9, 2012

(65) Prior Publication Data

US 2012/0123911 A1    May 17, 2012

Related U.S. Application Data

(62) Division of application No. 12/946,588, filed on Nov. 15, 2010, now Pat. No. 8,112,318.

(51) Int. Cl.
*G06Q 30/00* (2006.01)

(52) U.S. Cl. ...................................................... 705/26.1

(58) Field of Classification Search .................. 705/26.1
See application file for complete search history.

(56) References Cited

U.S. PATENT DOCUMENTS 7,077,006 B2 * 7/2006 Hansen ........................... 73/487
2009/0307031 A1 * 12/2009 Winkler et al. ................... 705/7

* cited by examiner

*Primary Examiner* — Mila Airapetian
(74) *Attorney, Agent, or Firm* — Frank J. Campigotto

(57) ABSTRACT

Systems, methods and computer program products are provided for managing a plurality of tires from their procurement through their disposal. An embodiment may include a method for determining all the costs of a tire over its total service life including procurement costs, repair costs, retread costs and disposal costs. An embodiment may include managing an inventory by automatically replenishing the inventory by following a set of stored inventory management rules. An embodiment may include helping to ensure that an impermissible tire is not mounted on a vehicle. A stored set of tire mounting rules automatically check the tire being mounted against requirements for the tire set by the rules, the requirements set as to by vehicle type and wheel position.

3 Claims, 10 Drawing Sheets

| | | TIRE SIZES, MAKE, SERIES | MAXIMUM TIMES RETREADED | MAXIMUM NUMBER OR REPAIRS | OTHER TIRE CONDITIONS |
|---|---|---|---|---|---|
| VEHICLE TYPE 1 | LEFT STEER AXLE | T1, T2, TN | #N | #N | #N |
| | RIGHT STEER AXLE | T1, T2, TN | #N | #N | #N |
| | MOUNTING POSITION N | T3, T4, TN | #N | #N | #N |
| VEHICLE TYPE 2 | LEFT STEER AXLE | T1, T6, TN | #N | #N | #N |
| | RIGHT STEER AXLE | T1, T2, TN | #N | #N | #N |
| | MOUNTING POSITION N | T7, T9, TN | #N | #N | #N |

SYSTEM AND METHOD FOR MANAGING A PLURALITY OF TIRES

This application is a divisional application of U.S. application Ser. No. 12/946,588 filed Nov. 15, 2010 now U.S. Pat. No. 8,112,318.

BACKGROUND OF THE INVENTION

1. Field of the Invention

This invention relates generally to analytical tools and data collection relating to tires and more particularly, to tools for collecting and analyzing cost and usage data of an individual tire over the life of a tire.

2. Description of the Related Art

Tires are a major expense for companies that operate large fleets of vehicles. In fact, for some fleet operators, the costs associated with tires are one of their highest costs next to fuel costs. Fleets are organizations that operate with a large number of vehicles and tires and include, for example, long-haul trucking companies, delivery and shipping companies, waste collection and disposal companies, bus operators, car and rental truck agencies, companies that operate fleets of off-the road (OTR) vehicles (e.g., fork lifts, skid steers, earth movers) and companies such as airline companies and air freight companies that operate with large numbers of aviation tires and OTR tires.

There is a need to improve the management of tires in the industry. While preventive maintenance programs are well known and have been put in place by many fleet operators, these preventive maintenance programs are more directed to the vehicles rather than to the tires. While such programs often have a tire component, the programs have not been successful in providing a useful tire management tool for managing tires from their procurement to their disposal.

One example of a preventive maintenance type tire management system may be found in U.S. Patent Application Publication US 2009/0307031 of Winkler, et al. The system disclosed therein is described as providing centralized management and an analysis of fleet information. The described system is performed similarly to other preventive maintenance systems and does not provide the level of tire management that is needed by fleet managers today. There is a need for tire management tools that can help the industry to more effectively manage their tires.

SUMMARY OF THE INVENTION

A particular embodiment of the present invention includes a method in a distributed data processing system for managing each of a plurality of tires from procurement through disposal. Such an embodiment may include creating a plurality of individual tire records, wherein one each of the plurality of individual tire records is associated with one each of the plurality of tires and storing a procurement notification for each of the tires in the associated individual tire record upon the tire being procured. The procurement notification may comprise a tire size, a tire make, a tire series, a tire procurement cost and a unique tire identifier, wherein the unique tire identifier provides a unit of identification for the tire.

Such an embodiment may include storing a mount notification for each of the tires in the associated individual tire record upon the tire being mounted on a vehicle. The mount notification may include the unique tire identifier, a unique vehicle identifier that provides a unit identification for the vehicle, a mounting position on the vehicle and a vehicle service indicator. The vehicle service indicator is based upon a reading from at least one of an odometer or an hour meter. Typically such an indicator my include, for example, an initial odometer reading and a final odometer reading, the difference in the reading providing the distance the vehicle has traveled between readings. The service indicator, for example, may include the raw readings or may include just the difference, expressed as distance traveled.

Such an embodiment may include storing a dismount notification for each of the tires in the associated individual tire record upon the tire being dismounted from the vehicle. The dismount notification may include the unique tire identifier, the unique vehicle identifier and the vehicle service indicator. Furthermore such an embodiment may include storing a repair notification for each of the tires in the associated individual tire record upon the tire being repaired. The repair notification may comprise the unique tire identifier, a description of a tire repair and a cost of the tire repair.

Such an embodiment may include storing a retread notification for each of the tires in the associated individual tire record upon the tire being retreaded. The retread notification may include the unique tire identifier, a description of a tire retread and a cost of the retread operation. Such an embodiment may include storing a tire disposal notification for each of the tires in the associated individual tire record upon the tire being scrapped, the tire disposal notification comprising the unique tire identifier.

An embodiment may include determining a total service cost for the tire, wherein the total service cost comprises a sum of the procurement cost, the repair cost, and the retread cost stored in the associated individual tire record of the tire. Other costs may be included, such as disposal costs.

An embodiment of the present invention is not limited to the procurement of only new tires. Indeed, the procurement notification may include a tire condition selected from new, used, retreaded and/or wheel-mounted. For example, often if a retreaded tire of a given size, make and series is pulled from inventory it is desirable to replace that tire with another retreaded tire of the same size, make and series.

In an embodiment, if the tire is a wheel-mounted tire, then the procurement notification may further include a unique wheel identifier, wherein the unique wheel identifier provides a unit identification for the wheel upon which the tire is mounted. Such a method may further include creating an individual wheel record for the wheel upon which the tire is mounted, the wheel record comprising the unique wheel identifier, a wheel type, a wheel size and a wheel condition.

An embodiment may include creating an individual vehicle record for the vehicle, wherein the individual vehicle record is associated with the unique vehicle identifier for the vehicle. An embodiment may further include storing vehicle information in the individual vehicle record. The vehicle information may include each mounting location on the vehicle, wherein each mounting location is defined by an axle and a wheel position on the axle.

A particular embodiment may include receiving an authorization for a tire purchase of one or more tires. The authorization may include a customer identification and a tire description, wherein the tire description may include a tire size, a tire make, a tire series and a tire condition for each of the one or more tires. The tire condition is selected from new, used, retreaded, repaired, wheel-mounted and combinations thereof. Such an embodiment may further include providing a delivery instruction for the one or more tires and invoicing the customer for the tire purchase. The delivery instruction may include a shipping address and the unique tire identifier for each of the one or more tires.

An embodiment may further include receiving an inventory change notification for the one or more tires, wherein the inventory change notification comprises the unique tire identifier for each of the one or more tires and a notice that the one or more tires entered an available tire inventory and storing the inventory change notification for the one or more tires in the associated individual tire records.

An embodiment of the present invention may include storing a set of tire inventory management rules that include instructions for automatically replenishing an available tire inventory. Such an embodiment may further include receiving an inventory change notification for one or more tires, wherein the inventory change notification comprises the unique tire identifier for each of the one or more tires and a notice that the one or more tires were removed from the available tire inventory.

Such an embodiment may further include searching the individual tire records associated with the one or more tires for the tire types and the tire conditions stored therein and determining from the set of inventory management rules whether authorization is provided to automatically purchase replenishment tires. Replenishment tires replace the one or more tires removed from the available tire inventory. It may include automatically purchasing a group of replenishment tires.

An embodiment may include storing a set of tire mounting rules. The set includes permissible tire criteria for each mounting location for a given vehicle, wherein the permissible tire criteria include a permissible tire size, a permissible tire make, a permissible tire series and a set of permissible tire conditions. Such an embodiment may include retrieving data from the individual tire record associated with the unique tire identifier for the tire being mounted on the vehicle. The mount notification includes the unique tire identifier of the tire, the unique vehicle identifier of the vehicle and the mounting position, the data comprising the tire size, the tire make, the tire series and one or more tire conditions.

It may further include comparing the permissible tire criteria for the mounting position of the vehicle with the retrieved data and sending a notice of permission if the retrieved data is in compliance with the permissible tire criteria.

An embodiment of the present invention may further include a distributed data processing system for managing each of a plurality of tires from procurement through disposal, the data processing system comprising a processor and a memory coupled to the processor. The memory contains instructions which, when executed by the processor, cause the processor to perform any of the methods disclosed above and/or disclosed in the detailed description of particular embodiments that follows.

An embodiment of the present invention may further include a computer program product comprising a computer useable medium having a computer readable program. The computer readable program, when executed on a computing device, causes the computing device to perform any of the methods disclosed above and/or disclosed in the detailed description of particular embodiments that follows.

The foregoing and other objects, features and advantages of the invention will be apparent from the following more detailed descriptions of particular embodiments of the invention, as illustrated in the accompanying drawing wherein like reference numbers represent like parts of the invention.

DETAILED DESCRIPTION OF PARTICULAR EMBODIMENTS

Figure 1:
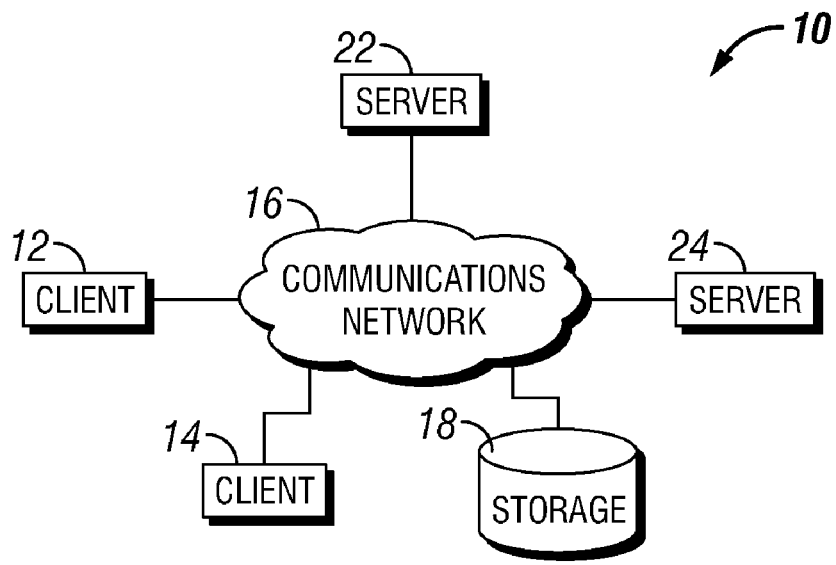
FIG. 1 is a block diagram illustrating an exemplary distributed data processing system in which various aspects of a particular embodiment of the present invention may be implemented.

A particular embodiment of the present invention includes methods in a distributed data processing system, systems and computer program products that are useful for managing tires, wheels and/or tire-mounted wheels in a fleet operation. It should be recognized that even though much of the discussion that follows is related to the trucking industry, such discussion is not meant to limit the invention to just trucks. Indeed the invention is meant to apply to a wide variety of fleets having a wide variety of vehicles, such vehicles including all types and sizes of trucks, aircraft, automobiles and OTR vehicles.

Since the cost of tires, including their procurement costs and their maintenance costs, are a significant portion of the total costs associated with fleet operations, there is an interest in choosing tires that provide the best value to the fleet and for matching the best tire to each vehicle type that operates in the fleet. There is an interest in monitoring both the cost and effectiveness of different tires on a variety of vehicle types since such monitoring provides the best information for making informed decisions regarding the selection of the most cost effective tire.

A particular embodiment of the present invention may include recording the costs and the performances of each tire in the fleet over its total service life, from its procurement to its disposal. Also, the performance of a group of tires on a particular type of vehicle in the fleet may be determined since an embodiment includes recording data about each of the vehicles upon which the tires are mounted.

A particular embodiment of the present invention may include managing the inventory of tires that are available for mounting on vehicles by automatically providing suitable replenishment tires to restock the inventory when tires are removed from the inventory. A particular embodiment may include automatically approving a tire selection for mounting on a vehicle to ensure that only permissible tires mounted.

It is of course recognized that wheels are the structures upon which tires are mounted. A tire is mounted on a wheel and the wheel is then mounted on the vehicle. Therefore, each wheel position on a vehicle is occupied with both a wheel and a tire, the wheel being mounted to the vehicle and the tire being mounted on the wheel. In the discussions that follow, any statement that indicates a tire is being mounted on a vehicle is used in the sense that a tire is first mounted on the wheel and then the wheel with the tire mounted on it is being mounted on a vehicle.

An embodiment of the present invention may include managing an available tire inventory of wheel-mounted tires, i.e., tires that are mounted onto wheels and stored in an available tire inventory until needed. An embodiment of the present invention may include managing an inventory of wheels upon which a tire may be mounted.

Each monitored tire has a unique tire identifier that provides a unit identification for the tire so that it can be separately monitored. Any suitable method and/or device for providing a unique tire identifier may be used. However, in a particular embodiment, the unique tire identifier should remain fixed to the tire during repair and retread operations as well as while in service on a vehicle and therefore the unique tire identifier may be characterized as being permanently affixed to the tire.

Examples of known methods and devices for providing a unique tire identifier include molding the identifier into the tire during the manufacturing process of the tire, embedding an RFID device in the tire, bonding a patch having an RFID device to the tire surface, branding the identifier into a surface of the tire or bonding a patch containing a bar code onto a surface of the tire.

The identifier may include, for example, a series of letters, numbers, symbols or combinations thereof as an indicator for use in identifying the tire. In the case of an RFID, the indicator is transmitted by the RFID device and may be read by a suitable RFID reader. In the case of a bar code, the indicator may be read by a suitable bar code reader. Of course if the identifier is molded or branded onto the side of a tire, a mechanic or technician, for example, may read it off from the side of the tire. These examples of providing a tire with a unique tire identifier are well known to one having ordinary skill in the art and further explanation or teaching is not necessary or suitable.

Likewise, each fleet vehicle may have a unique vehicle identifier that provides a unit identification for the vehicle. When a tire is mounted on the vehicle, the location of the tire can be identified with the unique vehicle identifier thereby enabling monitoring of the tire as to its location and its effectiveness and performance. Any suitable method and/or device for providing a unique vehicle identifier may be used. For example, the identifier may be the Vehicle Identification Number (VIN) assigned to the vehicle at manufacture, an RFID device affixed to the vehicle or an identifier painted or otherwise affixed to the vehicle. The identifier may include, for example, a series of letters, numbers, symbols or combinations thereof as an indicator for use in identifying the vehicle.

In a particular embodiment, each wheel has a unique wheel identifier that provides a unit identification for the wheel. When a tire is mounted on the wheel, the location of the tire can be identified with the unique wheel identifier. Furthermore, when the wheel is mounted on a vehicle, the location of the wheel may be identified with the unique vehicle identifier. Any suitable method and/or device for providing a unique wheel identifier may be used. For example, the identifier may be stamped or cast into the wheel during manufacture or a metal tag may be welded or otherwise permanently affixed to the wheel, the metal tag having the identifier, for example, stamped thereon. The identifier may include, for example, a series of letters, numbers, symbols or combinations thereof as an indicator for use in identifying the wheel.

The total service life of a tire (or a wheel) may be described as including a series of service segments. A service segment is the period between mounting a tire and dismounting a tire from a particular vehicle. Therefore, if a tire (or a wheel) was mounted (and dismounted) on a vehicle five different times over the life of the tire (or the wheel), whether on the same or different vehicles, the total service life of the tire (or the wheel), between procurement and disposal, includes five service segments. Each service segment may be measured, for example, by time (difference in date mounted and date dismounted), distance/hours (difference in vehicle service meter reading at mount and reading at dismount) and/or tread wear (difference in tread depth when mounted and when dismounted).

In a particular embodiment, a distributed data processing system is used for managing each of the plurality of tires and maintains a significant amount of information about each tire. Such information about each tire may be maintained in an individual tire record in a format that is associated with the unique tire identifier so that any information about a particular tire may be retrieved through such association. Each individual tire record may be maintained, for example, in one or more databases or other data storage format associated with a data processing system.

Examples of information that may be stored in the individual tire record include tire description data, such as the size, make and series of the tire as well as data related to its condition (e.g., new, retreaded, repaired, used, wheel-mounted and so forth); location data, such as on which vehicle the tire is mounted, in which inventory the tire is located, on which wheel the tire is mounted and so forth; service data, such as distances the tire has run (e.g., based on odometer readings) or the amount of tread that has been worn (e.g., based on tread depth measurements); and cost data, such as purchase price, repair costs, retreading costs, disposal costs and so forth.

A distributed data processing system may also be used to maintain information about each vehicle in the fleet upon which the plurality of tires may be mounted. Such information may be maintained in an individual vehicle record in a format that is associated with the unique vehicle identifier so that any information about it may be retrieved through such association. Each individual vehicle record may be maintained, for example, in one or more databases or other data storage format associated with a data processing system.

Examples of information that may be stored in the individual vehicle record include the vehicle make, model and year. Other data may include the tire mounting positions of the vehicle, i.e., the available locations for mounting a tire described, for example, by axle and wheel location on the axle. The individual vehicle record may also include a vehicle grouping. Vehicle groupings are defined by the fleet management and provide for placing vehicles into groups that may be of interest for measuring tire performance and effectiveness on a group of vehicles. For example, a fleet may classify each vehicle as being either a large, medium or small truck regardless of the make, model or year of the truck. Another grouping may be, for example, long-haul trucks, medium-haul trucks and short-haul trucks.

In a particular embodiment, a distributed data processing system may be used to maintain information about each wheel upon which the plurality of tires may be mounted. Such information may be maintained in an individual wheel record in a format that is associated with the unique wheel identifier so that any information about it may be retrieved through such association. Each individual wheel record may be maintained, for example, in one or more databases or other data storage format associated with the data processing system.

Examples of information that may be stored in the individual wheel record include the wheel type, wheel size (e.g., wheel diameter, flange width, number of lug holes) and its condition. The wheel type, for example, may include whether the wheel is a one-piece wheel or a multiple-piece wheel, whether the seat is a flat seat or a conical seat, whether the wheel is a hub piloted wheel or a stud piloted wheel, the wheel material (e.g., aluminum or steel) and so forth.

Data related to the wheel condition may include, for example, the age, the purchase date, the scrap date, the number of times the wheel has been refurbished (e.g., cleaned, painted, sand blasted and/or powder coated) and the dates of such refurbishment. A general condition of the wheel may also be recorded, such general condition being a subjective assessment by a technician while, for example, refurbishing the wheel or performing a preventive maintenance inspection. Measurements may be included in the individual wheel record, such as thickness of wheel mounting hub. A wheel condition may also include an indication as to whether the wheel is tire-mounted or non-tire-mounted, i.e., the wheel has a tire mounted on it or it does not.

The information maintained by a distributed data processing system, such as the information maintained for a tire, a vehicle or a wheel is received by the distributed data processing system as a notification. A notification as used herein is one or more communications between components of the distributed data processing system that includes the information contained in the notification. Such notifications may include, for example, a procurement notification, a mount notification, a dismount notification, a repair notification, a retread notification, a disposal or scrap notification, an inventory change notification, a location notification and so forth. As a skilled person will recognize, a communication may include information relevant to more than one notification. Indeed the notifications are, for example, procurement information, mounting information, dismounting information, repair information retread information, disposal information, inventory change information, location information and so forth.

As noted, a notification may include more than one communication between components of the system. For example, a mounting notification may include the unique tire identifier, the unique vehicle identifier upon which the tire is being mounted, the mounting position on the vehicle and an odometer reading from the vehicle. In one communication, a mechanic may provide the information about the tire and the vehicle and the date of the tire mount in one communication using, for example, a client device. In a second communication, the odometer reading may be provided automatically by a fleet server based, for example, upon an odometer reading stored in the server on a date that is close to the date of the tire mounting. Therefore, the mounting notification comprised two different communications between components of the distributed data processing system. Indeed, after receiving the date of the tire mounting in the first communication, a query could be sent automatically to the fleet server requesting the odometer reading for the given vehicle at the closest date to the mounting date. The response to that query would be the second communication.

In a particular embodiment, maintaining the data in the individual tire records and in the individual vehicle records is useful for determining the performance and effectiveness of tires mounted on a variety of vehicles. For example, by keeping track of the costs associated with a tire over the total service life of the tire, e.g., from procurement to disposal, the total costs associated with a given tire and/or group of tires of a given type/condition may be determined Examples of such costs may include, for example, costs for purchasing the tire, costs for repairing the tire, costs for retreading the tire and costs for scrapping the tire, if any.

Likewise, by recording the data related to each service segment of the tire (i.e., difference in dates, distance/hours, and/or tread wear between mounts/dismounts) along with the associated unique vehicle identifier for each service segment, the total service life of the tire and/or group of tires of a given type/condition may be determined by summing each of the service segments. For example, the total distance the tire ran over its total service life may be determined by summing the distances that the tire ran on each service segment of the tire.

Such information is useful for determining the performance and effectiveness of a given tire type (size, make and series) over its total service life. For example, the cost per unit distance, e.g., $/mile, of a tire may be determined by dividing the total costs associated with the tire during its total service life by the total distance the tire ran. Likewise, the cost per unit distance of a tire on a particular vehicle type (year, make, model and/or group) may be determined by dividing the total costs for the tire over the service segments during which the tire was mounted on the particular vehicle type by the total distance the tire ran in those service segments.

Of course other useful performance ratios may also be determined both for the total service life of the tire or for only those service segments that the tire was mounted on a particular vehicle type. Such other ratios may include, for example, total cost per unit of tread wear ($/$32^{nd}$ inch of wear) or distance per unit of tread wear (miles/$32^{nd}$ inch of wear).

A particular embodiment of the present invention provides for storing a tire location record in the individual tire record. Such storing provides a history of all the different locations the tire has been over its total service life. Examples of such locations may include an available tire inventory, a repair shop, a retread shop, a vehicle (identified by its unique vehicle identifier), a mounting position (axle and wheel position), a wheel (identified by its unique wheel identifier), in transit, e.g., between the truck yard and a retread shop, and scrapped. Such information may be communicated for storage in a distributed data processing system, for example, as an inventory change notification or a location notification, such notification including, for example, the unique tire identifier for the tire, the location of the tire or the change in location of the tire and an effective date of such location or change in location.

In addition to storing the tire location record, a particular embodiment may further include storing a date record for the dates the tire entered and exited each location in the individual tire record. For example, the process may include storing the dates a tire entered and exited an available tire inventory, the dates a tire was mounted and dismounted from a vehicle (the vehicle identified by its unique vehicle identifier), and/or the dates a tire was mounted and dismounted from a wheel (the wheel identified by its unique wheel identifier). Of course such date records are associated with the relevant location records stored in the individual tire record so that, for example, the date a tire entered the available tire inventory may be determined.

A particular embodiment of the present invention may include managing an available tire inventory and may further include managing an available wheel inventory. An available tire inventory is a plurality of tires that are available for mounting on vehicles, the tires covering a range of tire types (size, make, series) having a range of conditions. An available wheel inventory is a plurality of wheels that are available for mounting tires on them, the wheels having a range of wheel types, sizes and conditions. Managing such an inventory may include automatically replenishing the inventory in accordance with a set of inventory management rules.

A tire condition describes a tire as having one or more characteristics. Examples of such conditions include: new, used, retreaded, regrooved, repaired, the number of times the tire has been retreaded, the retreaded tread installed, the number of times the tire has been repaired, the sizes and locations of the repairs, the tread depth, the casing age, and so forth. The tire condition may further include, for example, whether the tire is wheel-mounted or not wheel mounted.

Tires may enter the available tire inventory as, for example, new tires that were purchased or otherwise procured from a new tire source, used tires that were purchased or otherwise procured from a used tire source, retreaded tires that were returned, purchased or otherwise procured from a retreading shop, repaired tires that were returned, purchased or otherwise procured from a repair shop, tires that were removed from vehicles and sent to the available tire inventory, and so forth. A tire that was sent to a retreading shop from the truck yard, was retreaded at the retreading shop and then returned to the truck yard to be stored in the available tire inventory is a retreaded tire that was returned from a retreading shop. Alternatively, a retreaded tire that was purchased from a retreading shop would be a retreaded tire purchased from a retreading shop.

Wheels may enter the available wheel inventory as, for example, new wheels that were purchased or otherwise procured from a new wheel source, used wheels that were purchased or otherwise procured from a used wheel source, refurbished wheels that were returned, purchased or otherwise procured from a wheel refurbishment shop, wheels that were dismounted from vehicles and having had their tires removed, sent to the available wheel inventory and so forth.

In a particular embodiment, a tire in the available tire inventory may enter the inventory with its condition being a wheel-mounted tire or a non-wheel-mounted tire. If the tire is a wheel mounted tire, the individual tire record may include the unique wheel identifier of the wheel upon which the tire is mounted. Likewise, a tire in a non-wheel-mounted condition may, at a later date, be mounted on a wheel and remain in the available tire inventory. The individual tire record for that tire may then be updated to include the unique wheel identifier of the wheel upon which it was mounted.

Each time a tire enters or leaves the available tire inventory, the individual tire record for that tire is updated with a change in its location record. Each time a wheel enters or leaves the available wheel inventory, the individual wheel record for that wheel is updated with a change in its location record. The date of the location change may also be recorded in a date record associated with the location record.

With the location information recorded in the individual tire record for each of a plurality of tires, the location of a particular tire (identified by its unique tire identifier) may be found by searching the plurality of individual tire records for the unique tire identifier and then determining the location of the tire from the location record stored in the individual tire record associated with the unique tire identifier.

Likewise, with the location information recorded in the individual wheel record for each of a plurality of wheels, the location of a particular wheel (identified by its unique wheel identifier) may be found by searching the plurality of individual wheel records for the unique wheel identifier and then determining the location of the wheel from the location record stored in the individual wheel record associated with the unique wheel identifier.

Similarly all the tires or all the wheels located at a given location may be found and identified by their unique identifier by searching the plurality of the individual tire or wheel records for tires or wheels having a location record that indicates the given location. For example, all the tires in the available tire inventory may be found and identified by searching the plurality of the individual tire records for location records indicating that the tire is located in the available tire inventory. The results of the search may result in identifying, listing and/or recording the unique tire identifier from the individual tire records of all of the tires having a location record indicating that the tire is located in the available tire inventory. Additionally the search results may include providing a description of each tire, the description including, for example, the tire type and the tire condition as stored in each of the individual tire records.

In an embodiment, the tire records for tires found in a particular location may be processed by sorting the found tires into groups having common characteristics. For example, tires that are found in the available tire inventory may be sorted into groups of tires by size, make, series, condition or combinations thereof. In an embodiment, such grouping may, for example, result in the tires first being sorted by size, then within each of those groups again sorted by series, then within each of those groups again sorted by make and then within each of those groups again sorted by conditions. Such sorting results in tires that have the same size, make, series and condition being grouped together. Additionally, the number of tires in each group and/or subgroup or combination may also be summed for determining the number of found tires in each group or combination of groups in the available tire inventory. Of course such technique may be used for sorting the wheels.

In a particular embodiment, a search of the individual wheel records for wheels located in the available wheel inventory may similarly occur with similar results, i.e., such a search, for example, may result in identifying/listing and/or recording the unique wheel identifier from the individual wheel records of all the wheels having a location record indicating that the wheel is located in the available wheel inventory and further include providing a description of each wheel, the description including, for example, the wheel type, size and condition as stored in each of the individual wheel records.

If a manual search of the inventory is made and compared to the generated list of all inventoried tires and/or wheels, those that are not found in the inventory during the manual search may be identified as being lost or stolen. The location records of those tires and/or wheels may then be updated in their individual tire and/or wheel record to classify them as being lost or stolen. Such a list may be monitored to determine the costs associated with such losses and may be used as a tool to search for and to find lost tires and/or wheels so that they may be returned to the available tire and/or wheel inventory.

A search of the individual tire records for tires in the available tire inventory may be narrowed by searching for tires of a given type, of a given condition or combinations thereof. A search of the individual wheel records for wheels in the available wheel inventory may be narrowed by searching for wheels of a given type, of a given size, of a given condition or combination thereof.

For example, a search may be made for all tires of a given type that are new or that are retreaded or of all tires of a given type that have been retreaded no more than one time and are wheel-mounted. The search may further be narrowed to find such tires that are wheel-mounted on a steel wheel or even more narrowed to find such tires that are mounted on a hub piloted steel wheel. The result of such a search may include identifying and/or generating a list of all tires located in the available tire inventory that satisfy the search criteria as to tire type and condition. Such a generated list can also be summed for determining the number of found tires in the available tire inventory that satisfy the search criteria.

A similar search technique may be used for wheels in the available wheel inventory wherein the search result may include generating a list of the wheels of a given type, size and condition that meet the search criteria and determining the number of found wheels in the available wheel inventory.

Managing an inventory such as the available tire inventory or the available wheel inventory may include automatically replenishing the inventory in accordance with a set of inventory management rules. Such inventory management rules may be stored in a distributed data processing system and provide instructions for automatically replenishing the inventory if certain criteria are met.

An example of such criteria may be a minimum total inventory level so that if the total inventory falls below a predetermined low inventory level, then the inventory may be automatically replenished.

Another example of such criteria may be a minimum inventory of specifically characterized tires or wheels (e.g., size, type, condition or combinations thereof) in the inventory so that if the inventory of the specifically characterized items falls below a predetermined low inventory level of those items, then the inventory of those specifically characterized items may be automatically replenished.

Another example of such criteria may be to replace one-for-one a tire or wheel removed from the available inventory with a replenishment tire or wheel having the same characterization as the removed item, i.e., the same size, make, series and condition.

The inventory management rules for automatically replenishing the inventory if certain criteria are met may include an authorization to automatically purchase or otherwise procure replenishment tires and/or replenishment wheels once the certain criteria are met. Such procurement may include, for example, generating a purchase order and/or generating a delivery instruction, wherein such order or instruction may include a customer name, a description of the replenishment tires, the number of replenishment tires, a unique tire identifier for each of the replenishment tires and a delivery address or combinations thereof.

The inventory management rules for automatically replenishing the inventory may further include an instruction for replenishing the inventory to a predetermined full inventory level. For example, if the predetermined low inventory level is 10 items and the predetermined full inventory level is 15 items, then if the actual inventory level is 9 items, an order may be placed for 6 items to replenish the inventory to the full inventory level of 15 items.

In an embodiment, a determination of the inventory level may be performed, for example, whenever an item enters and/or leaves the inventory, at a set time period (e.g., the first of each month, the first of each week, daily), upon an manually entered request to determine the inventory level or combinations thereof.

Optionally the tire inventory management rules may include groupings of equivalent tire types/conditions so that if the provider of one tire type/condition is, for example, out of stock and cannot provide that particular tire type/condition, the available tire inventory may be automatically replenished by procuring a suitable equivalent replenishment tire as identified and approved in the inventory management rules.

For example, if a tire having a particular set of characterizations (e.g., size, make, series, condition or combinations thereof) is to be procured, any tire in a group of equivalent tires in which it is grouped may be procured as a replenishment tire. In an embodiment, the tire inventory management rules may group equivalent tires together in an equivalent tire group so that any tire in an equivalent tire group may be substituted by another tire in the same equivalent tire group.

An embodiment may include determining if the set of tire inventory management rules identifies an equivalent tire group, the equivalent tire group comprising characterizations of equivalent tires, the characterizations selected from a tire size, a tire make, a tire series, a tire condition and combinations thereof. If the rules define an equivalent tire group in which the replenishment tire is a member, then the process may include automatically procuring the replenishment tire with any member selected from the equivalent tire group.

Optionally, instead of authorizing the automatic procurement of replenishment items without further stipulations, the inventory management rules may stipulate that a request for authorization be sent, such request seeking approval to proceed with the automatic procurement of the replenishment items. Such request may include, for example, a description of the proposed replenishment items, such as, for example, size, make, series, type, condition or combinations thereof.

Optionally the request may include a variety of suitable equivalent replacement tires or wheels, such equivalent replacement items discussed above. The request may then direct a selection of the equivalent items in a number required to fill the inventory back to a predetermined full inventory level. In an embodiment, the response to the request may include an override provision, wherein the response provides authorization to procure tires or wheels not originally included in the request for authorization.

In a particular embodiment, when the inventory management rules provide authorization to automatically procure replenishment tires and/or wheels after authorization to procure them has been received, a purchase order may be automatically generated for the number of authorized tires and/or wheels, the order providing the tire size, make, series and condition of the tires and/or the wheel type, size and condition, the shipping address and the billing address.

The purchase order may then be processed and filled with each of the procured tires having a unique tire identifier and/or each of the procured wheels having a unique wheel identifier. A delivery instruction may be generated that provides, for example, the shipping address for the tires and/or wheels and the unique tire and/or wheel identifier for each of the tires and/or wheels. A new individual tire record is created for each of the procured tires, the record being populated with the unique tire identifier and the associated the tire size, make, series and condition. A new individual wheel record is created for each of the procured wheels, the record being populated with the unique wheel identifier and the associated the wheel size, type and condition.

When the tires and/or wheels arrive at their destination, e.g., the available tire and/or wheel inventory, the individual tire or wheel record may be updated to include the new location, e.g., the available tire or wheel inventory or, if mounted immediately upon a vehicle (bypassing inventory), then updated to include the unique vehicle identifier and mounting position of the tire.

In a particular embodiment, a tire is managed when it is mounted or dismounted from a vehicle. For example, an embodiment may include updating the individual tire record associated with the tire being mounted. Such updating may include, for example, storing the unique tire identifier of the vehicle, a mounting position on the vehicle (defined by an axle and wheel location on the axle), the mounting date, the measured tread depth and a vehicle service indicator based upon, for example, an odometer reading or an hour meter reading.

An embodiment may include updating the individual tire record associated with the tire being dismounted. Such updating may include, for example, storing the unique vehicle identifier and the vehicle service indicator.

An embodiment may include performing a check on the tire being mounted on a vehicle to help ensure that only a tire suitable for its intended service can be mounted on a vehicle. The ensure that only a suitable tire is mounted on a vehicle, a comparison is made between the characteristics of the tire being mounted and a set of tire mounting rules that identify suitable tires for mounting on a vehicle.

Such tire mounting rules may be stored in a distributed data processing system. It is contemplated that each fleet owner would provide or otherwise approve a set of applicable vehicle tire mounting rules. Such rules may, for example, identify for a particular vehicle type the sizes, makes, series and conditions of tires that would be permissible for mounting on a particular axle and wheel position of the vehicle.

In an embodiment, the tire mounting rules stored in the distributed data processing system identify permissible tire criteria for each mounting location on a given vehicle. The permissible tire criteria comprise, for example, a permissible tire size, a permissible tire make, a permissible tire series, a permissible tire condition and combinations thereof.

The permissible tire condition may include, for example, one or more of the following: a maximum casing age, a maximum number of retread operations, a maximum number of nail hole repairs, a maximum number of section repairs, a maximum number of bead repairs, a maximum number of inner liner repairs, a maximum number of spot repairs (i.e., grind and repair) and a minimum tread depth.

Other tire condition specifications that may be included in such a set of rules are, for example, a maximum number of repairs to the sidewall, a maximum number of repairs to the crown, a maximum size of a repair made to the tire and a maximum number of cords that were broken in a repaired section.

Alternatively, a severity of repair factor may be defined by the tire mounting rules. Such factor may be stored in the individual tire record as a tire condition parameter. The severity of repair factor may be utilized as an indication of the extent to which the tire has been repaired. The vehicle mounting rules may then include providing a severity of repair factor as a limitation for mounting a tire on a given vehicle type and mounting position. Then, in a particular embodiment, the check to ensure that a permissible tire is being mounted on a vehicle may provide comparing the severity of repair factor of the tire with the factor stipulated in the tire mounting rules instead of or in addition to the more lengthy comparison of many of the conditions discussed above. Each time the tire was repaired or retreaded, the severity of repair factor may be updated in the individual tire record to reflect the changed condition of the repaired/retreaded tire.

While it is contemplated that the severity of repair factors would be developed to suit the requirements of a fleet owner, an example may be that the factors would range between 0 and 10, wherein 0 would describe a tire with no repairs/retreads while a 10 would describe a tire having the maximum extent of repairs/retreads allowed by fleet management.

For example, a tire with a sidewall repair could be assigned a factor of 4. A tire having a repair of a given size in the crown could be assigned a factor of 3. The mounting rules could then stipulate, for example, that a permissible tire for a particular vehicle type and mounting position must have a severity of repair factor less than 2 while another mounting position must have a severity of repair factor less than 5. It is contemplated that steer tires, for example, would have lower permissible severity of repair factors while trailer tires, for example, would have higher permissible severity of repair factors.

A particular embodiment may include receiving a mount notification for a tire being mounted on a vehicle. The mount notification may include the unique tire identifier of the tire being mounted, the unique vehicle identifier of the vehicle and the mounting position on which the tire is to be mounted.

As noted above, an embodiment may include storing a set of tire mounting rules, wherein the set identifies permissible tire criteria for each mounting location of a given vehicle, wherein the permissible tire criteria comprise a permissible tire size, a permissible tire make, a permissible tire series and a permissible tire condition.

So that the tire data may be compared against the permissible tire criteria, an embodiment may further include retrieving data from the individual tire record associated with the unique tire identifier for the tire being mounted on the vehicle, the retrieved data comprising a tire size, a tire make, a tire series and a tire condition.

Since the tire mounting rules provide permissible tire criteria for each mounting location of a particular vehicle, the unique vehicle identifier provides the type of vehicle the tire is being mounted upon and allows the system to retrieve the permissible tire criteria for the vehicle mounting position upon which the tire is to be mounted.

By comparing the retrieved permissible tire criteria with the retrieved tire data, a determination may be made as to whether the retrieved tire data is in compliance with the retrieved permissible tire criteria.

Therefore, as noted above, a check that a permissible tire is being mounted may be performed by comparing the stored tire description of the tire being mounted (stored in the individual tire record of the tire) with the set of stored vehicle tire mounting rules that stipulate the tire types/conditions that would be permissible for mounting a tire on a given vehicle at a given mounting position. If the tire type and its condition as described in the individual tire record for the tire being mounted does not comply with the requirements of the tire mounting rules, then a notice may be generated to indicate that an impermissible tire is being mounted.

Additionally, the notice of an impermissible tire being mounted may provide a selection of "permissible" tires that are located in the available tire inventory. Such permissible tires may be listed with their unique tire identifier. One of these permissible tires may then be selected for mounting on the vehicle.

To locate such permissible tires, an embodiment may include searching the plurality of individual tire records for those that include a tire location record indicating that the tire is located in an available tire inventory and further include the permissible tire criteria for the mounting position of the vehicle. Tires located by such a search may be identified as found tires and may be included as a list of available permissible tires in the notice of non-compliance.

The check that a permissible tire is being mounted on a vehicle may be made before the tire is delivered to a mechanic. Indeed, such a check may be performed when the tire is pulled from inventory for delivery to the vehicle, when the tire is being mounted on the vehicle, or both. For example, an inventory manager may select a tire for mounting on a vehicle in response to a request on a work order. The inventory manager may then request an approval of the tire as a permissible tire. Such request would include providing the unique tire identifier of the selected tire and the unique vehicle identifier and wheel position for the vehicle on which the tire is to be mounted. A comparison of the data related to tire type and condition that is contained in the individual tire record with the requirements of the tire mounting rules as applied to the submitted unique vehicle identifier and wheel position may provide a notice that the submitted tire is permissible if the tire is found to be in compliance with the tire mounting rules. Otherwise, a notice that the submitted tire is not permissible may be generated if the tire is found not to be in compliance with the tire mounting rules.

In an embodiment, the check that a permissible tire is being mounted on a vehicle may also include a check that the wheel is permissible. The tire mounting rules may include rules stipulating permissible wheel types, sizes and conditions that, if not met, would make the tire being mounted an impermissible tire. Examples of permissible tire condition criteria may include a maximum wheel age, a maximum number of refurbishments, a minimum thickness of the wheel-mounting hub and combinations thereof.

In a particular embodiment, a tire may be monitored during an inspection of the tire, e.g., during a routine maintenance procedure. If a tire is inspected while mounted on a vehicle, then the individual tire record may be updated by recording data relating to the tire condition including, for example, the remaining tread depth on the tire and the current vehicle service indicator, e.g., an odometer reading.

Based upon the recorded remaining tread depth, or other recorded data relating to the tire condition, a forecast may be provided as to when the tire will need to be replaced. For example, as discussed above, from the information provided in the individual tire record, the tread wear per unit distance (e.g., miles) that the tire has provided in service to the particular vehicle type may be determined. With the measured tread depth measurement, made during the routine inspection, a determination of the number of miles remaining before the tread is worn to its limit may be made by dividing the available remaining tread to be worn by the ratio of tread wear per mile as determined from the historical data for the tire or tire type.

A notice may then be generated, when such odometer reading is within a predetermined amount, that a tire change is necessary and further may identify an available permissible tire, by its unique tire identifier, for use as a replacement tire. The available permissible tire may be found and identified by searching the available tire inventory for tires that comply with the vehicle tire mounting rules as discussed above. Such notice provides a management tool for scheduling anticipated maintenance needs and for ensuring that a permissible tire is available in the available tire inventory when needed.

In a particular embodiment, a fleet server (e.g., a preventive maintenance (PM) server) may be included in a distributed data processing system. The fleet server may exchange information with the database (or other suitable data storage) that stores the individual tire records and the individual vehicle records. For example, since many fleets have servers that monitor fuel costs and record the odometer readings every time a truck is filled with fuel, such odometer readings may be used to update the individual tire record for each tire on the vehicle being fueled.

If the fleet server updates the individual tire record with data such as, for example, odometer readings, then such data need not be manually entered into the system. For example, such use eliminates the need for an odometer reading to be entered manually when a tire is mounted on a vehicle. Instead of manually entering the odometer reading at the start of the service segment for that tire, i.e., when a tire is being mounted on a vehicle, the odometer reading that the fleet server recorded closest in time to the date that the tire was mounted may be retrieved from the fleet server and stored in the individual tire record.

Data may also be passed to the fleet server to minimize the need for double entering of data by employees. Information that may be provided to the fleet server may include, for example, the tires identified by their unique tire identifier that are installed on a vehicle identified by its unique vehicle identifier, the wheel positions of such tires, the cost of services performed for retreading and repairs, identify of the service provider and the measured tread depths of tires.

If a tire is removed from a vehicle because it is necessary to retread or repair the tire, then the tire location record may be updated to indicate that the tire is being sent out for repair or for retreading. The tire condition record may also be updated with the measured tread depth and with the final odometer or hour meter reading of the vehicle. In a particular embodiment, the mechanic removing the tire may also record mechanic identification, such as the mechanic's initials or employee number.

By indicating that the tire is being sent out for repair or retreading, the tire may be entered into a pickup inventory, wherein tires that are to be picked up by the retread shop or by the repair shop are stored until such pickup is made. In an embodiment, when the pickup inventory reaches a predetermined level, a notice is automatically generated to the retread or repair shop providing instructions to pick up the tires for repair/retreading. Alternatively, the retread/repair shop may monitor the pickup inventory and make a pickup when a certain number of tires are available for pickup. Alternatively, the fleet management may monitor the pickup inventory and arrange to ship the tires to the retread/repair shop at a suitable time.

After the tires are picked up, the tire location record for each of the tires is updated to reflect that the tire was taken to the retread/repair shop on the pickup date. Optionally the tire may be tracked through the retread shop or through a repair shop. For example, the retread shop and/or repair shop may record in the individual tire record when a tire arrives at the shop, when it has been buffed to remove the old tread, when it has applied the retread tread and when it has left the shop and is being shipped back to the truck yard.

When the tires are repaired and/or retreaded and returned, the tire location record for each tire is updated to show the new location, e.g., available tire inventory, and the date it entered the inventory. The record is further updated to include the work that was performed on the tire. For example, if the tire was retreaded, then the updated record would indicate that the tire was retreaded one more time and also identify the tread band that was installed on the tire. If the tire was repaired then the updated record would indicate, for example, the number, size, location and extent of each repair. Optionally, if the fleet utilizes a severity of repair factor, then the factor may be updated to reflect the tire condition. The total cost for the repairs and/or retreads may also be recorded. Such repair costs optionally may be broken into both labor and materials components.

In a particular embodiment, the process may further include generating a purchase order for the retread/repair work and invoicing fleet management for the work performed.

If a tire is removed from a vehicle and the tire is of such condition that repair is not suitable, then the tire record is updated to indicate that the tire (identified by the unique tire indicator) has been scrapped or otherwise disposed of when such event occurs. The tire record may include, for example, the date that the tire was scrapped and the cost associated with scrapping the tire, e.g., hauling expense and disposal expense. The record may also include the location to which the tire was scrapped.

Optionally, a pre-scrap inventory location may be maintained where the tires are sent until they can be inspected by a technician or other inspector. The technician may then inspect each tire and confirm the decision to scrap the tire and provide a reason for the tire being scrapped. Such reason may include, for example, not repairable, maximum number of retreads has been performed, maximum number of repairs has been performed and so forth.

In a particular embodiment, many reports are available based upon the recorded data related to both the tires and the vehicles on which they are mounted. Since each tire is being monitored over its total service life, from its procurement through its disposal, the costs associated with each tire can be determined. Total costs may include, for example, the procurement cost, the costs of all repairs/retread operations (optionally broken into materials and labor) and the cost of disposal.

Likewise the distance (and/or hours) that the tire provided in service may be determined even if the tire provided service on several different vehicles. For example, a tire may have provided service as a steer tire on one vehicle, then pulled and retreaded. As a retreaded tire it may have provided drive service on a second vehicle, then pulled and retreaded. As a twice retreaded tire, it may have provided service on a third vehicle, then pulled and scrapped. Each service for the tire, i.e., the identified vehicle for each service and the beginning and ending odometer readings from each identified vehicle, is identified and the service provided for each vehicle individually as well as the total service provided by the tires over all the vehicles may be determined.

For example, a tread performance report may be generated that reports the service provided by a tire tread in distance, hours and/or tread wear. Such a report provides the service (total distance, total time and/or total tread worn) for each segment of use by the tire. For example, the report may provide, for a given tire, the service for the new tire tread, the service for the first retread on the tire and the service for the second retread on the tire.

A tread spend report may be generated that reports the total cost for each segment of use by the tire. For example, the report may provide, for a given tire, the total procurement cost and any repair costs over the life of the new tire tread, the total retread cost and any repair costs over the life of the first retread on the tire and the total retread cost and any repair costs over the life of the second retread on the tire. In an embodiment, the scrap costs may also be included in the final service segment.

Likewise a casing performance report and a casing spend report may be generated that would provide the sum of the costs of the segment reports. Thus, the casing performance report may provide the total service the casing provided over its life, e.g., total distance, total time and/or total tread worn. The casing spend report may provide all the expenses applied to the tire casing over its life, e.g, procurement cost, all repair and retread costs and scrap costs.

In particular embodiments, the reports may be generated using certain filters as is well known in the art. Such filters may include, for example, dates, location, vehicle, vehicle type, tire, tire type and wheel position. It may be noted that some tires are more effective on one type of vehicle than on another type of vehicle. The filters can be used to generate reports that demonstrate how different types of tires perform on particular types of vehicles. Comparisons of these data can determine a preferred tire for a given vehicle type and wheel position.

In a particular embodiment, vehicle reports may be generated that provide information on the cost of tires (e.g., total cost of all tires or cost of one or more of a particular tire type) used by a particular type of vehicle or by all vehicles of a particular type.

Reference will now be made in detail to embodiments of the invention, one or more examples of which are illustrated in the drawings. Each example is provided by way of explanation of the invention. For example, features illustrated or described as part of one embodiment can be used with another embodiment to yield still a third embodiment. It is intended that the present invention include these and other modifications and variations.

Figure 2:
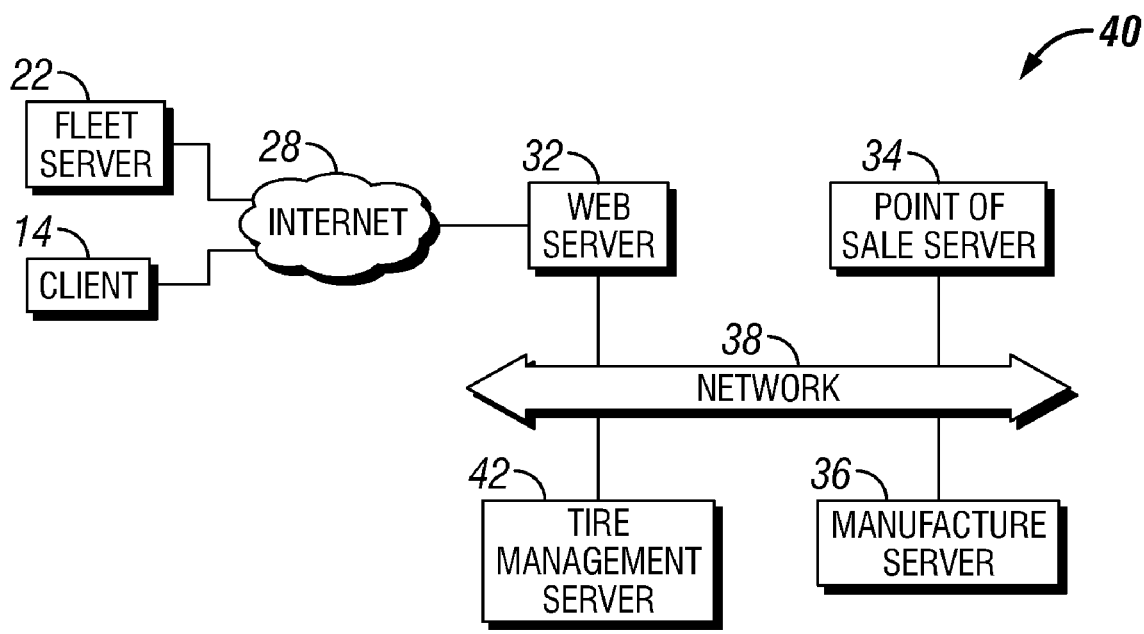
FIG. 2 is a block diagram illustrating an exemplary distributed data processing system having a web server in which various aspects of a particular embodiment of the present invention may be implemented.
Figure 3:
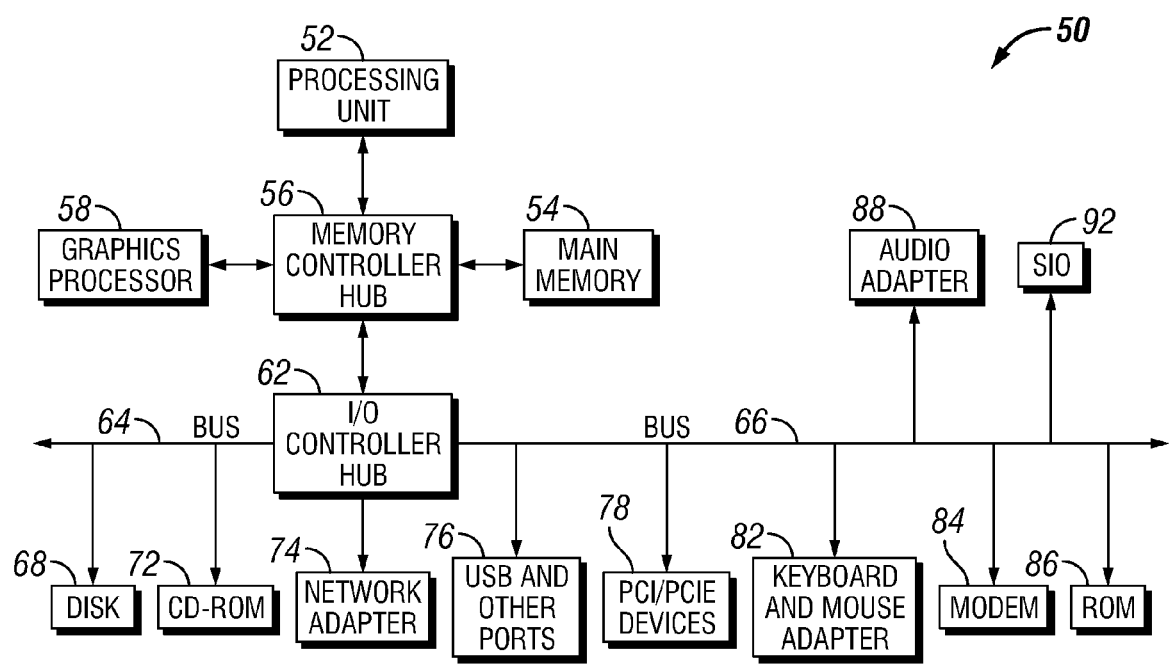
FIG. 3 is a block diagram of an exemplary data processing system in which various aspects of particular embodiments of the present invention may be implemented.

With reference now to the figures and in particular to FIGS. 1-3, displays of exemplary data processing environments are provided that are useful for implementing a particular embodiment of the present invention. It should be noted that these displays are exemplary in nature only and are not intended to assert or imply any limitation with regard to environments that are useful for implementing a particular embodiment of the present invention. Indeed, many modifications to the illustrated environments may be made without departing from the spirit and scope of the present invention.

FIG. 1 is a block diagram illustrating an exemplary distributed data processing system, i.e., a computer network, in which various aspects of a particular embodiment of the present invention may be implemented. The system 10 includes at least one communications network 16, which is a medium used to provide communication links between various devices and computers connected together within the system 10. The communications network 16 may include connections, such as wire, wireless communication links and/or fiber optic cables.

In the illustrated example of FIG. 1, a first server 22 and a second server 24 are connected to the communications network 16 along with a storage unit 18 and clients 12, 14. The clients 12, 14 may be, for example, personal computers, network computers, workstations, smart phones, PDA's and the like. The servers 22, 24 provide data and images to the clients in response to queries made by the clients 12, 14. The clients may also provide data to the servers. Of course a particular embodiment of the present invention may include additional servers, clients, storage units and devices not shown in the exemplary system 10 of FIG. 1.

The communications network 16 of a particular embodiment is the Internet, which is a worldwide collection of networks and gateways that use the Transmission Control Protocol/Internet Protocol (TCP/IP) suite of protocols to communicate with one another. The backbone of the Internet includes high-speed data communication lines between major nodes or host computers, consisting of thousands of commercial, governmental, educational and other computer systems that route data and messages. Of course the communications network 16 may also be implemented to include a number of different types of networks, such as an intranet, a local area network (LAN), a wide area network (WAN) or the like. As stated above, FIGS. 1-3 are intended as examples, not as an architectural limitation for different embodiments of the disclosed subject matter, and therefore, the particular elements shown in FIGS. 1-3 should not be considered limiting with regard to the environments in which the illustrative embodiments may be implemented.

FIG. 2 is a block diagram illustrating an exemplary distributed data processing system having a web server in which various aspects of a particular embodiment of the present invention may be implemented. In this illustration of a computer network 40, a client 14 and a fleet server (e.g., preventive maintenance server) 22 are connected through the Internet 28 to a web server 32. The web server 32 communicates with other servers, clients and devices through the Internet 28 and communicates to a point of sale server 34, a tire management server 42 and a manufacturing server 36 over a LAN 38. Of course the LAN 38 may, for example, be a WAN, the Internet or the like a particular embodiment of the present invention may include other numbers of servers, clients, storage units and devices not shown in the exemplary system 30 of FIG. 2.

Generally the web server 32 hosts web services that the clients 14 consume and provides responses in a typical form, e.g., web pages or data arrays passed to a FLASH player installed on the client 14. The web server 32 can communicate with the other servers 34, 42, 36 on the LAN 38 and passes requests for information on to the proper server and receives information from the servers to store and/or to send to the client 14 over the Internet. The web server 32 may receive notifications from the client 14 and/or the fleet server 22 such as, for example, procurement, repair, retread, mount, dismount and disposal notifications. Such notifications may then be passed on to the tire management server 42, the point of sale server 34 or the manufacture server 36. Examples of communications that the client 14 may receive from the web server include reports, requests for authorizations (e.g., procurement), and other notices and requests sent to the client 14 in accordance with embodiments of the present invention.

In an embodiment the web server 32 may communicate with the client 14 over the Internet using Internet Information Services (IIS), a web server application available from Microsoft. COLDFUSION, a software product available from Adobe, is a program that may be installed on the web server 32 to communicate between the web server 32 and the other servers 34, 42, 36 on the LAN 38. The fleet server 22 can communicate both with the client 14 and the web server 32.

The point of sale server 34 may provide point of sale services for tire purchases including invoicing, pricing, delivery instructions, accounting and work order generation. In a particular embodiment, the server may operate on an AS400 operating system with an IBM DB2 database. The server may also run the tire software application for tire dealers that is available from MaddenCo, Inc. to provide the described functions.

In an embodiment, the manufacturing server 36 executes the Michelin BIBTREAD software. BIBTREAD software is a comprehensive retread management system provided by Michelin that tracks tires being retreaded through the retread process. The software provides the instructions to the technicians at the retread/repair operation to perform the services requested by the customer. It may also record the costs and materials associated with the retread/repair operations and also track the tire location as it passes through the retread operation. The costs, materials and locations of the tire are passed by the manufacture server 36 to the tire management server 42 for updating the individual tire record with the location data, cost data and materials data. The cost and materials data may also be passed to the point of sale server 34 for generation of an invoice for the retreading operation. In an embodiment, the cost and materials data may also be passed to the fleet server 22 via the tire management server 42 and the web server 32.

The tire management server 42 is, in a particular embodiment, a server operating in a Windows Server Operating System available from Microsoft with a Microsoft SQL 2005 server application. The tire management server 42 stores information for implementing a particular embodiment of the present invention. For example, the tire management server 42 stores all the information concerning the tires being monitored, the vehicles being monitored and stores all the information relating to rules and instructions for implementing portions of a particular embodiment. The tire management server 42 also generates reports, such as total costs for tires or groups of tires, tread performance, tread spend and casing performance, that are passed to the web server 32 and then on to the client 14 and/or the fleet server 22.

FIG. 3 is a block diagram of an exemplary data processing system in which various aspects of a particular embodiment of the present invention may be implemented. In the depicted example, the system 50 employs a hub architecture including a bridge and memory controller hub 56 and a bridge and input/output (I/O) controller hub 62. The processing unit 52, main memory 54 and graphics processor 58 are connected to the memory controller hub 56. The graphics processor 58 may be connected to the memory controller hub 56 through an accelerated graphics port (AGP). The processing unit 52 may be, for example, a symmetric multiprocessor (SMP) system including a plurality of processors in the processing unit 52 or alternatively, for example, other multiprocessor systems or a single processor system may be employed.

In the depicted example, the system 50 further includes a network adapter 74 that connects to the I/O controller hub 62. An audio adapter 88, keyboard and mouse adapter 82, modem 84, read only memory (ROM) 86, hard disk drive (HDD) 68, CD-ROM drive 72, universal serial bus (USB) ports and other communication ports 76, and PCI/PCIe devices 78 connect to the I/O controller hub 62 through a bus 66. A Super I/O device 92 may also connect to this same bus 66. PCI/PCIe devices may include, for example, Ethernet adapters, add-in cards, and PC cards for notebook computers. PCI uses a card bus controller, while PCIe does not. The ROM 86 may be, for example, a flash basic input/output system (BIOS). The HDD 68 and CD-ROM connect to the I/O controller hub through a second bus 64.

An operating system runs on the processing unit 52. The operating system coordinates and provides control of various components within the data processing system 50 in FIG. 3. As a client, the operating system may be a commercially available operating system such as WINDOWS XP or WINDOWS 7, available from Microsoft. As a server, the system 50 may be, for example, an IBM SYSTEM P server running the IBM Advanced Interactive Executive operating system or a LINUX operating system or a Microsoft operating system, such as Microsoft Advanced Server.

Instructions for the operating system and for applications for implementing particular embodiments of the present invention are located on storage devices, such as the HDD 68, and may be loaded into the main memory 54 for execution by the processing unit 52. An implementation for a particular embodiment of the present invention may be performed by the processing unit 52 using computer usable program code, which may be located in a memory such as, for example, the main memory 54, ROM 86, or in one or more peripheral devices, such as the HDD 68 and/or the CD/ROM 72.

To communicate with a server over the Internet, the client may utilize a browser application for requesting and displaying web pages that are sent over the Internet by a server. Such web pages are typically in Hypertext Transfer Protocol (HTTP) format but may be in other formats as well. For example, data and other forms of information may be displayed on a browser using ADOBE FLASH files sent as a .SWF file from the server.

Those of ordinary skill in the art will appreciate that the hardware in FIGS. 1-3 may vary depending on the implementation. Other internal hardware or peripheral devices, such as flash memory, equivalent non-volatile memory, or optical disk drives and the like, may be used in addition to or in place of the hardware depicted in FIGS. 1-3.

It should be recognized that embodiments of the present invention may take the form of an entirely hardware embodiment, an entirely software embodiment or an embodiment containing both hardware and software elements. In particular embodiments, including those embodiments of methods, the invention may be implemented in software, which includes but is not limited to firmware, resident software and microcode.

Furthermore, a particular embodiment of the invention can take the form of a computer program product or application accessible from a computer-readable medium providing program code for use by or in connection with a computer or any instruction execution system. Such computer code or instructions implement one or more of the described features of described embodiments. For the purposes of this description, a computer-usable or computer readable medium can be any apparatus that can contain or store the program for use by or in connection with the instruction execution system, apparatus or device including, but not limited to, random access memory (RAM), read-only memory (ROM), a rigid magnetic disk and an optical disk, e.g., CD-ROM, CD-R/W and DVD.

Figure 4:
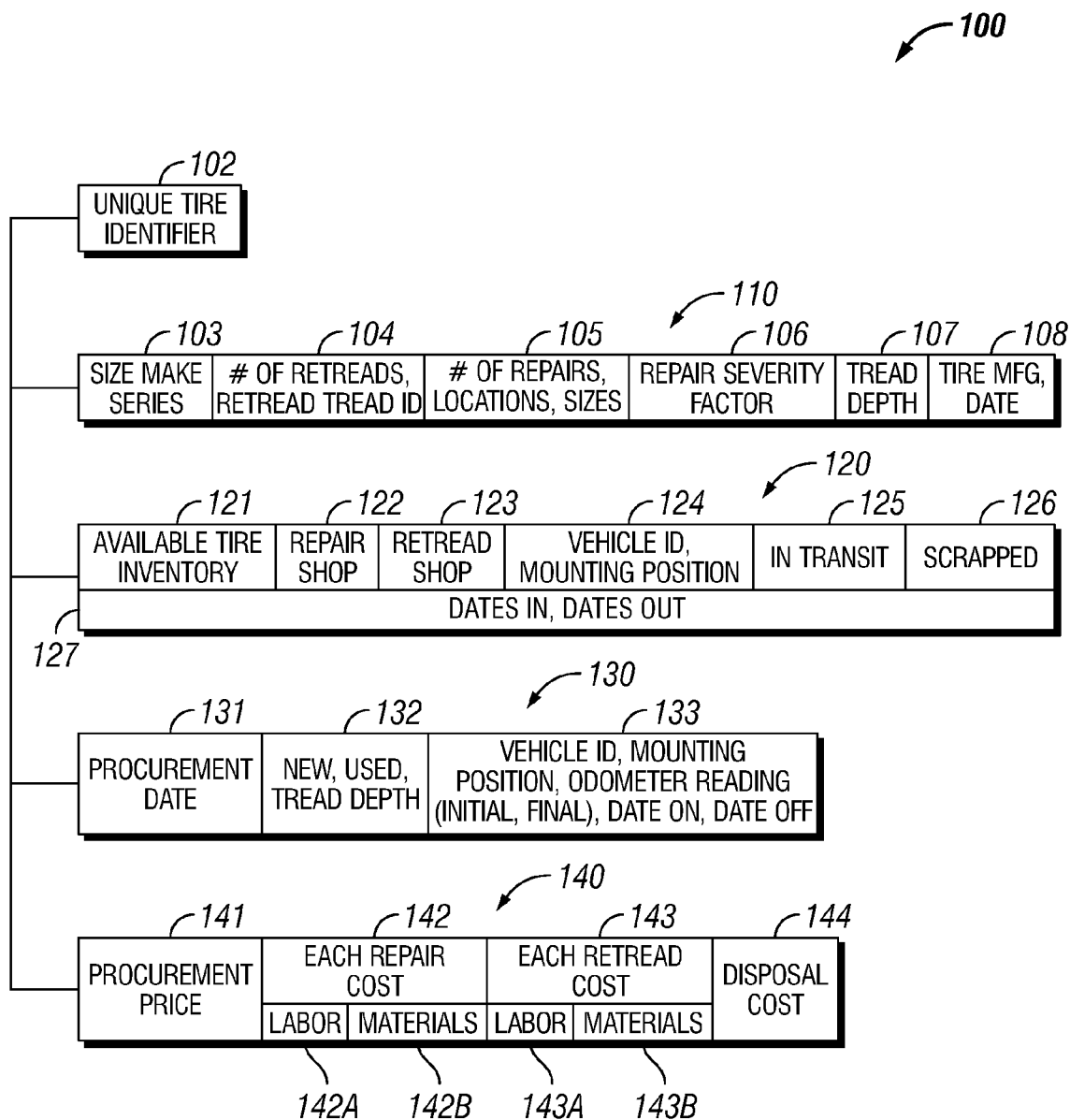
FIG. 4 is block diagram of an exemplary individual tire record associated with a unique tire identifier.

FIG. 4 is block diagram of an exemplary individual tire record associated with a unique tire identifier. In a particular embodiment, an individual tire record 100 is generated for each tire that enters the system, either as a new tire, a used tire, a retreaded tire, a regrooved tire or so forth. It should be noted that the tire data included in FIG. 4 is exemplary only and additional data or less data may be included for each tire in a particular embodiment.

Each individual tire record 100 may be described as including four different classifications: the description record 110, the tire location record 120, the tire usage record 130 and the tire cost record 140. Of course such division into classifications of the tire data is merely subjective and the invention is not limited by such subjective division. Such division is made merely for purposes of discussion herein. The data type described as being in one of the classifications could easily be classified as being in one or more additional classifications and the number of classifications may be increased or decreased. Indeed, in a particular embodiment, such classification of the data is not made.

The unique tire identifier 102 provides the link between an individual tire and all the data associated with it. Data for a tire is entered into the system with the associated unique tire identifier. Searches for information about a particular tire can be made using the unique tire identifier 102.

The tire description record 110 includes pertinent descriptive information for the tire such as the tire size, make and series 108, the number of retread operations performed on the tire 104 and the identification of the retread tread applied to the tire during each retread operation. The tire description record may further include, for example, each measured tread depth 107, a repair severity factor (as discussed above) 106 and the manufacturing date and place of manufacture of the tire 108. Alternatively, instead or in addition to the repair severity factor 106, the individual tire record may include a list of tire conditions that describe the tire as discussed above.

The tire location record 120 provides the location of the tire and the date 127 the tire arrived at the location and left the location. Such locations may include, for example, the available tire inventory 121, the repair shop 122, the retread shop 123, a particular vehicle on which the tire is mounted 124 including, for example, the unique vehicle identifier and the mounting position (axle and wheel position). Additionally the location may be "in transit" 125, such as between the retread shop or warehouse and the truck yard. Finally, when the tire is permanently removed from service, the tire location is "scrapped" 126.

The tire usage record 130 provides data related to the service of the tire, both on the types of vehicles on which the tire was mounted and the distance/hours of service the tire provided for each vehicle. Such data may include, for example, the procurement date 131 of the tire and whether the tire was purchased new or procured as a used tire 132. If procured new, the initial tread depth may be retrieved from the description of a new tire. If procured as a used or retread tire, the measured tread depth at the time the tire was procured is entered into the system. Each vehicle 133 on which the tire was mounted is entered (as the unique vehicle identifier) along with the mounting position, the service meter readings of the vehicle at mount/dismount of the tire and the dates of mounting and removal.

In a particular embodiment, the service meter readings of the vehicles are not recorded in the individual tire record for each service segment but instead, the difference in the service meter readings are recorded to reflect the distance or hours of service provided by the tire over the service segment (either partial or total service segment). Likewise the tread wear may be stored as the total wear of the tread over the service segment instead of the individual tread depth readings. A partial service segment reading would be stored when the service segment is not complete, i.e., the tire is still in service and/or has remaining service life).

The tire cost record 140 provides data related to the costs associated with the tire. Such costs include, for example, the procurement cost 141, the cost of each repair 142 that was made to the tire, such costs being itemized as labor costs 142(*a*) and material costs 142(*b*), the cost of each retread operation 143 that was made to the tire, such costs being itemized as labor costs 143(*a*) and material costs 143(*b*) and disposal cost 144.

Figures 5, 6:
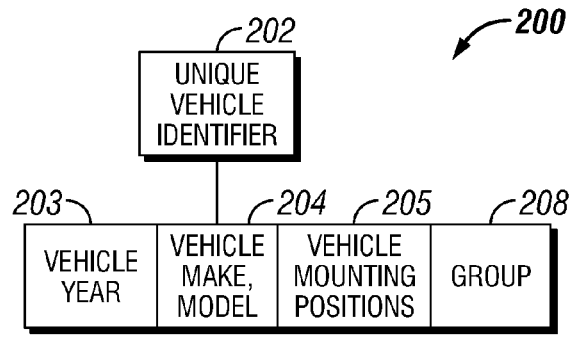
FIG. 5 is a block diagram of an exemplary vehicle identification record associated with a unique vehicle identifier.
FIG. 6 is a block diagram of an exemplary set of tire mounting rules for different vehicle types and mounting positions.

FIG. 5 is a block diagram of an exemplary vehicle identification record associated with a unique vehicle identifier. In a particular embodiment, a vehicle identification record 200 is generated for each vehicle that enters the system. It should be noted that the vehicle data included in FIG. 5 is exemplary only and additional data or less data may be included for each vehicle in a particular embodiment.

The unique vehicle identifier 202 provides the link between an individual vehicle and all the data associated with it. Data for a vehicle is entered into the system with the associated unique vehicle identifier. Searches for information about a particular vehicle can be made using the unique vehicle identifier 202.

Data associated with the unique tire identifier may include, for example, the vehicle year 203, the vehicle make and model 204, assigned group 208 and the tire mounting positions 205 that are included on the vehicle. Mounting positions 205 include the position of each wheel on each axle associated with the vehicle. In a particular embodiment, each vehicle is associated with a set of vehicle mounting rules 300 as shown in FIG. 6. The assigned group 208, as discussed above, provides fleet management with a tool for grouping vehicles together so that tire use on vehicles assigned to a particular group can be monitored. In an embodiment, a group may have one vehicle in the group or may have more than one vehicle in the group.

FIG. 6 is a block diagram of an exemplary set of tire mounting rules for various vehicle types and mounting positions. In a particular embodiment, a set of mounting rules 300 are stored in a data processing system such as the tire management server 42 shown in FIG. 2. The tire mounting rules stipulate, for a given vehicle type 301 and mounting position 205, the permissible tire sizes, makes and series 303 and permissible tire conditions for a tire being mounted on a vehicle. Examples of such conditions include the maximum number of times the tire has been retreaded 304, the maximum number of times the tire has been repaired 304 and other conditions 306 as set by fleet management, examples of which are discussed above.

The vehicle type 301, for example, may be defined by the year 203, make and model 204 of the vehicle and/or by the assigned vehicle group 208. In an embodiment, the vehicle type 301 is defined fully by the group 208 to which the vehicle was assigned. The permissible tires 303 may be defined by the by the tire sizes, makes and series 307 that may be mounted on a particular vehicle type 301 for a particular mounting position 205. More than one tire size, make and series may be listed 307 as the tire rules may define a group of tires as being equivalent tires, any one of which would be a permissible tire.

A particular vehicle type 301 may have ten different mounting positions 205. The tractor vehicle typically used on a long-haul truck may have a left steer axle wheel position and a right steer axle wheel position. Additionally the vehicle may have two drive axles, the front drive axle and the rear drive axle, each axle having four wheel positions. Therefore, for example, the vehicle may have a left outer front drive axle wheel position and a left inner front drive axle wheel position.

FIGS. 7-11 provide flow charts of exemplary embodiments of the present invention. While some limited reference is made to the exemplary distributed data processing system shown in FIG. 2, such references to the exemplary system should not be construed as limiting the invention in any way. One skilled in the art will recognize that the exemplary embodiments disclosed herein may be implemented on a wide range of system architectures.

Furthermore, while the disclosure herein and the flow charts that follow indicate an order of operations performed by a particular embodiment of the present invention, it should be understood that such order is exemplary, as alternative embodiments may perform the operations in a different order, combine certain operations or the like. As noted, references in the specification to a particular embodiment may include a particular feature, structure or characteristic but every embodiment may not necessarily include the particular feature, structure or characteristic.

Figure 7:
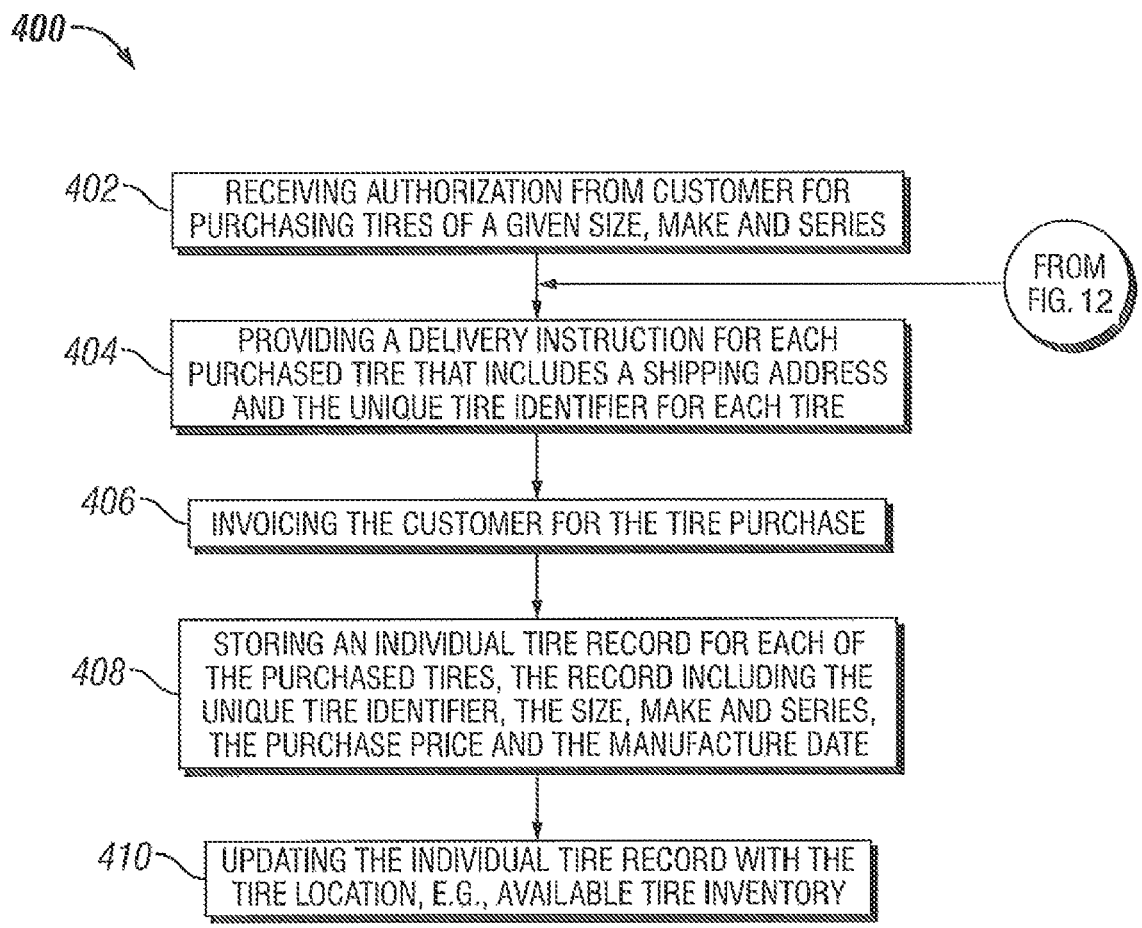
FIG. 7 is a flow chart of an exemplary embodiment that includes automatically processing a purchasing request for a tire.

FIG. 7 is a flow chart of an exemplary embodiment that includes automatically processing a purchasing request for a tire. In a particular embodiment, a fleet manager may provide an authorization for purchasing tires. Such authorization may, for example, be sent from a client 14 to the web server 32, which passes the authorization to the point of sale server 34. In block 402, the authorization for purchasing tires of a given size, make and series is received. In block 404, the system provides a delivery instruction for each purchased tire that includes a shipping address and the unique tire identifier assigned to each of the purchased tires.

In block 406, the system generates an invoice and invoices the customer for the tire purchase. Such invoicing may include, for example, generating the invoice at the point of sale server 34, passing it on to the web server 32 and sending it to the client 14 over the Internet 28. In block 408, for example the tire management server 42, stores an individual tire record for each of the purchased tires. The individual tire record includes, for example, the unique tire identifier, the size, make and series of the tire, the purchase price and the manufacture date of the tire.

In block 410, the system (e.g., the tire management server 42) updates the individual tire record with the tire location, e.g, the available tire inventory. Of course alternatively, if the tire is immediately mounted on a vehicle and bypasses the inventory, then the system updates the individual tire record with the unique vehicle identifier and the mounting position.

Figure 8:
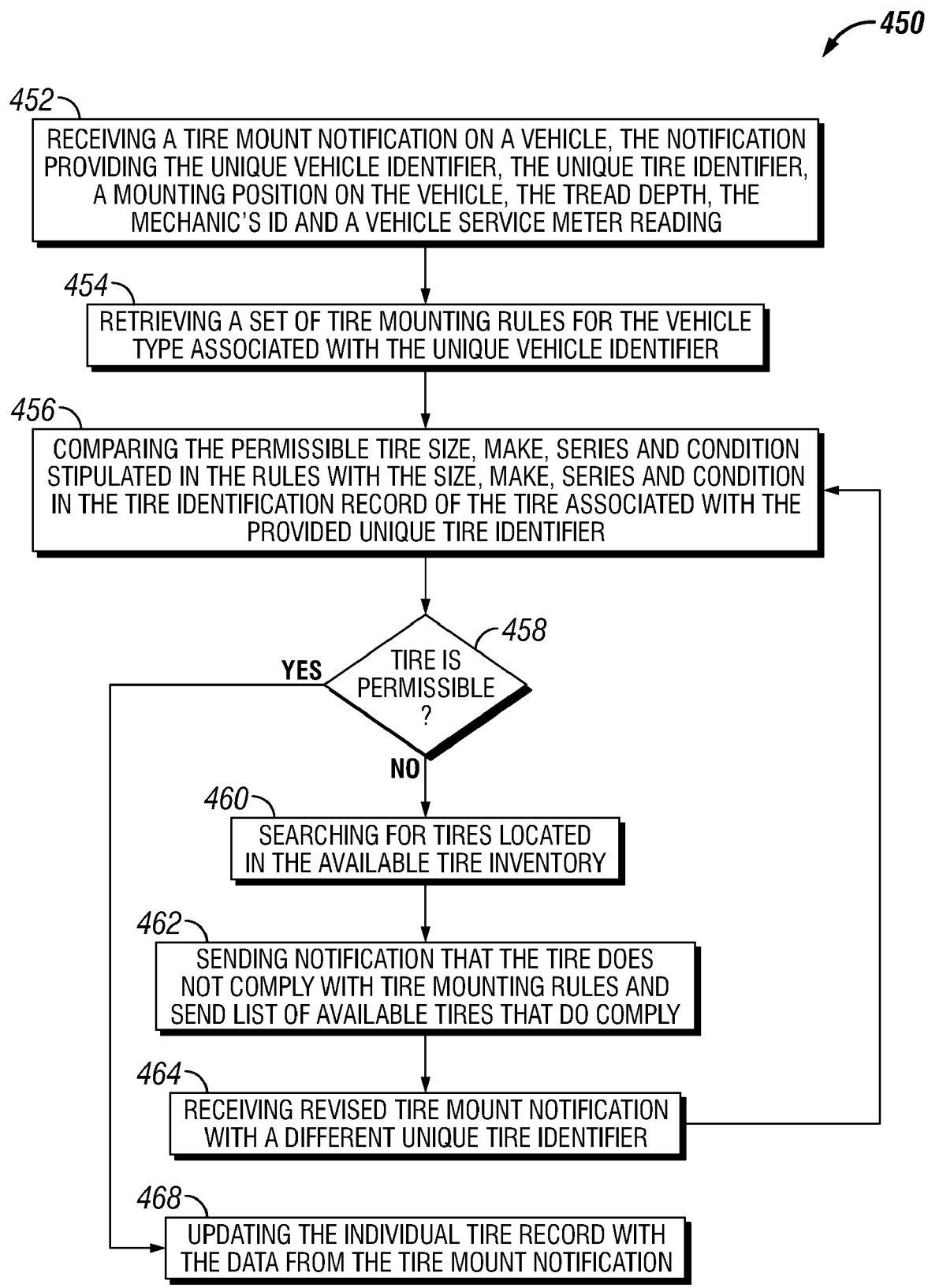
FIG. 8 is a flow chart of an exemplary embodiment that includes determining whether a tire being mounted on a vehicle complies with a set of tire mounting rules.

FIG. 8 is a flow chart of an exemplary embodiment that includes determining whether a tire being mounted on a vehicle complies with a set of tire mounting rules. Tire mounting rules may be provided by the fleet manager in a particular embodiment, specifying permissible tire sizes, makes, series and conditions of tires that may be mounted on a particular vehicle type at each of its mounting locations.

In a particular embodiment, in block 452, the system receives a tire mount notification for a particular vehicle. Such a notification may be sent, for example, by the client 14 over the Internet 28 to the web server 32, which then passes the notification to the tire management server 42. The notification may include, for example, the unique tire identifier, a unique vehicle identifier, the mounting position on the vehicle, the measured tread depth, the mechanic's identification and a vehicle service meter reading, e.g., an odometer reading.

In block 454, the system, for example the tire management server 42, retrieves the set of tire mounting rules for the vehicle type associated with the unique vehicle identifier. In block 456, a comparison is made between the permissible tire size, make, series and condition specified by the mounting rules with the same type of information contained in the individual tire record associated with the unique tire identifier in the mount notification.

In block 458, if the tire is permissible, then in block 468, the individual tire record is updated with the data from the tire mount notification. A notification may also be sent to the client 14, for example from the tire management server 42 to the web server 32 and then over the Internet 28, that the tire was permissible and that the individual tire record has been updated to reflect the new location of the tire, i.e., mounted on the vehicle corresponding to the vehicle having the unique vehicle identifier.

In block 458, if the tire is not permissible, then in block 460, the system searches for tires in the available tire inventory that satisfy the mounting rule stipulations as to permissible tire sizes, makes, series and conditions. In block 462, a notice is sent to the client 14 that the tire was not suitable for mounting on the proposed vehicle and a list is provided of available tires in the available tire inventory that do comply with the mounting rules. Such notice may be sent, for example, by the tire management server 42 to the web server 32 and then to the client 14 over the Internet 28.

In block 464, the system receives a revised mount notification that indicates a different tire has been mounted, the revised notification providing the unique tire identifier for the different tire. In block 456, the system repeats the process of blocks 456-468 as discussed above.

Figure 9:
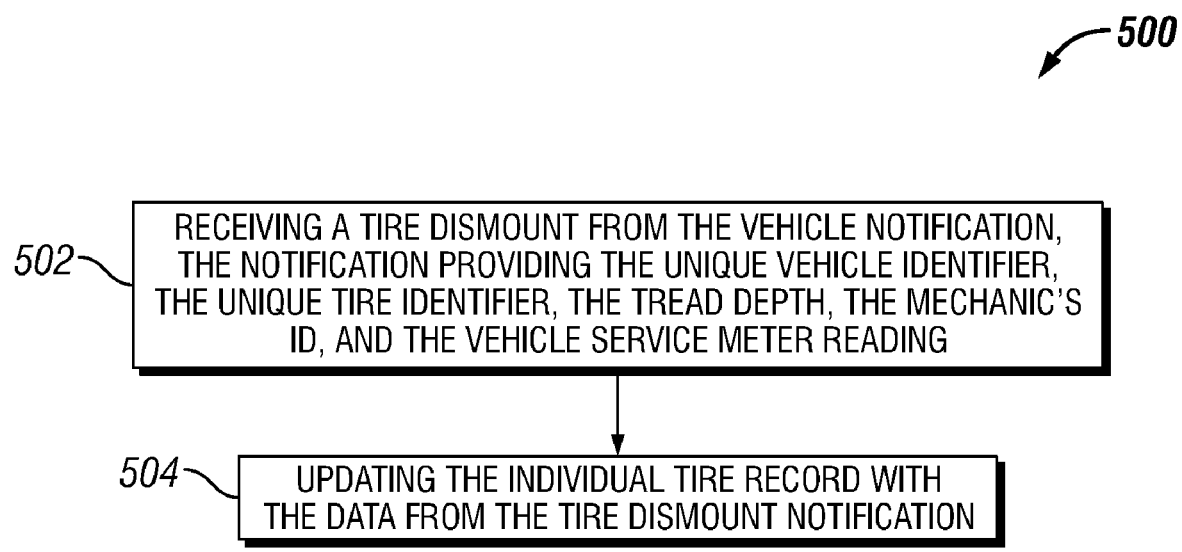
FIG. 9 is a flow chart of an exemplary embodiment that includes updating an individual tire record when the tire is dismounted from a vehicle.

FIG. 9 is a flow chart of an exemplary embodiment that includes updating an individual tire record when the tire is dismounted from a vehicle. To maintain an adequate record of the tire over its total service life, the tire identification record is updated to document changes in a tire's location and/or service. In block 502, a tire dismount notification for a vehicle is received, the notification providing the unique vehicle identifier from which the tire is being dismounted, the unique tire identifier, the tread depth of the tire, the mechanic's identification and the vehicle service meter reading. In a particular embodiment, such notification may be sent by the client 14 over the Internet 16 to the web server 32, which passes the notification to the tire management server 42.

In block 504, the system (e.g., the tire management server 42) updates the individual tire record with the data contained in the dismount notification. If the dismount notification further includes a new location for the tire and the date the tire was sent to the new location, e.g., the date the tire was sent to a retread shop, repair shop, an available tire inventory or so forth, then the system may further update the individual tire information record to include the new location and the date the tire was sent to the new location.

Figure 10:
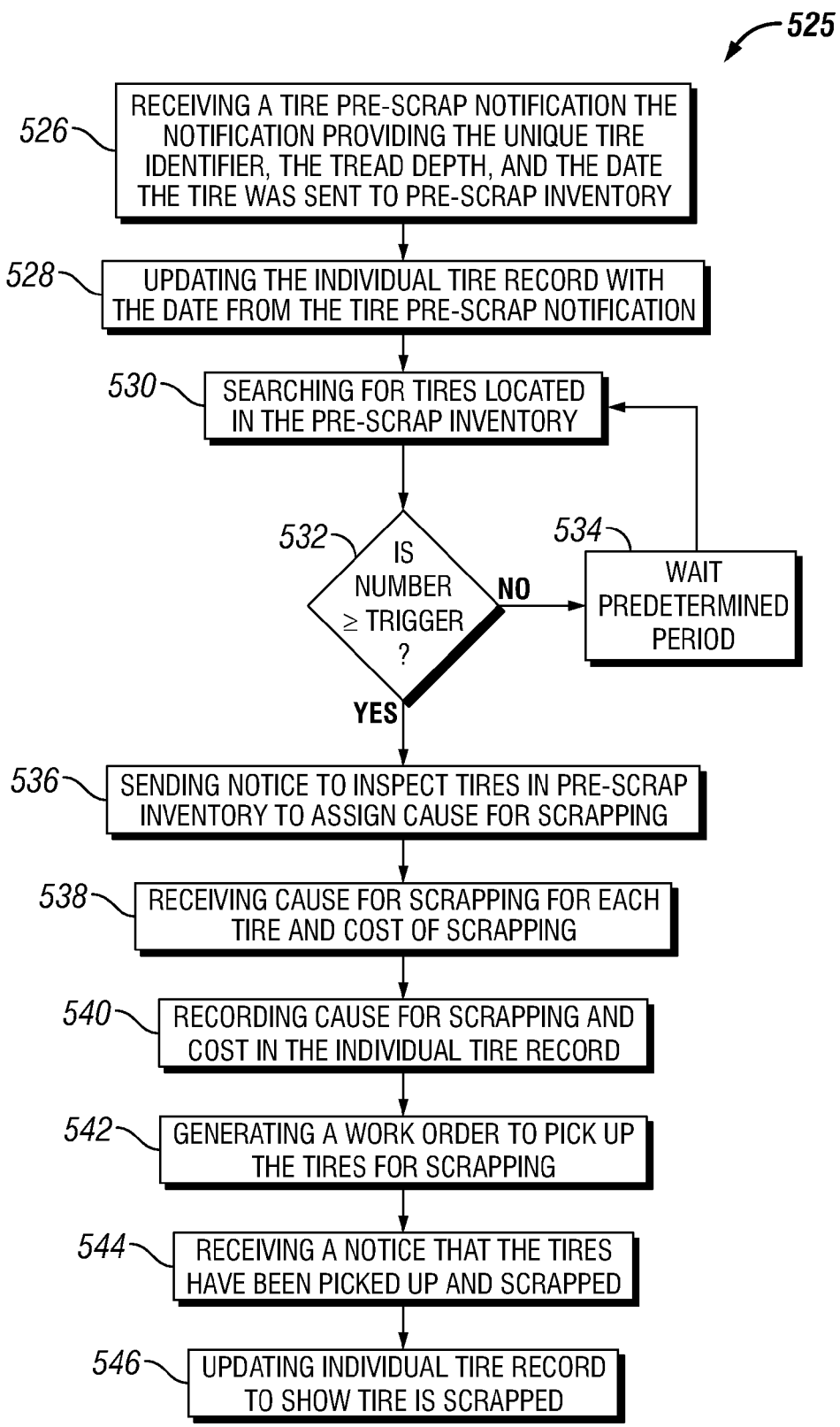
FIG. 10 is a flow chart of an exemplary embodiment that includes updating an individual tire record when the tire is scrapped.

FIG. 10 is a flow chart of an exemplary embodiment that includes updating an individual tire record when the tire is scrapped. In an embodiment, a tire may be sent to a pre-scrap inventory for inspection before being scrapped. In block 526, the system receives a tire pre-scrap notification, which includes, for example, the unique tire identifier, the tread depth and the date the tire was sent to the pre-scrap inventory. In a particular embodiment, such notification may be sent by the client 14 over the Internet 16 to the web server 32, which passes the notification to the tire management server 42. It is likely that such a notification may be contained within a tire dismount notification.

In block 528, the system updates the individual tire record with the data contained in the pre-scrap notification. When the pre-scrap inventory has a supply of tires to inspect that is greater than a predetermined number, a notice may be sent to the fleet management to inspect the tires and provide a reason for the disposal. In block 530, a search is conducted to determine the number of tires in the pre-scrap inventory. In block 532, if the number of such tires is less than the predetermined number that triggers a notice, then in block 534 the process waits before proceeding again to block 530.

In block 532, if the number of tires is at least as great as the predetermined number trigger, then in block 536 a notice is sent to fleet management to inspect the tires and determine the cause for scrapping the tire (e.g., damage too large to repair, too close together, casing age, number of times retreaded).

In block 538, a cause for scrapping each tire is received (e.g., from the client 14) if the decision to scrap the tire is confirmed. Additionally the cost for scrapping the tire may be received. In block 540, the cause for scrapping the tire is recorded in the individual tire record as well as the cost of scrapping the tire. In block 542, a work order may be generated to pick up the tire for scrapping. In block 544, a confirmation that the tire has been picked up and scrapped is received and in block 546, the individual tire record is updated to show that the tire is scrapped.

Figure 11:
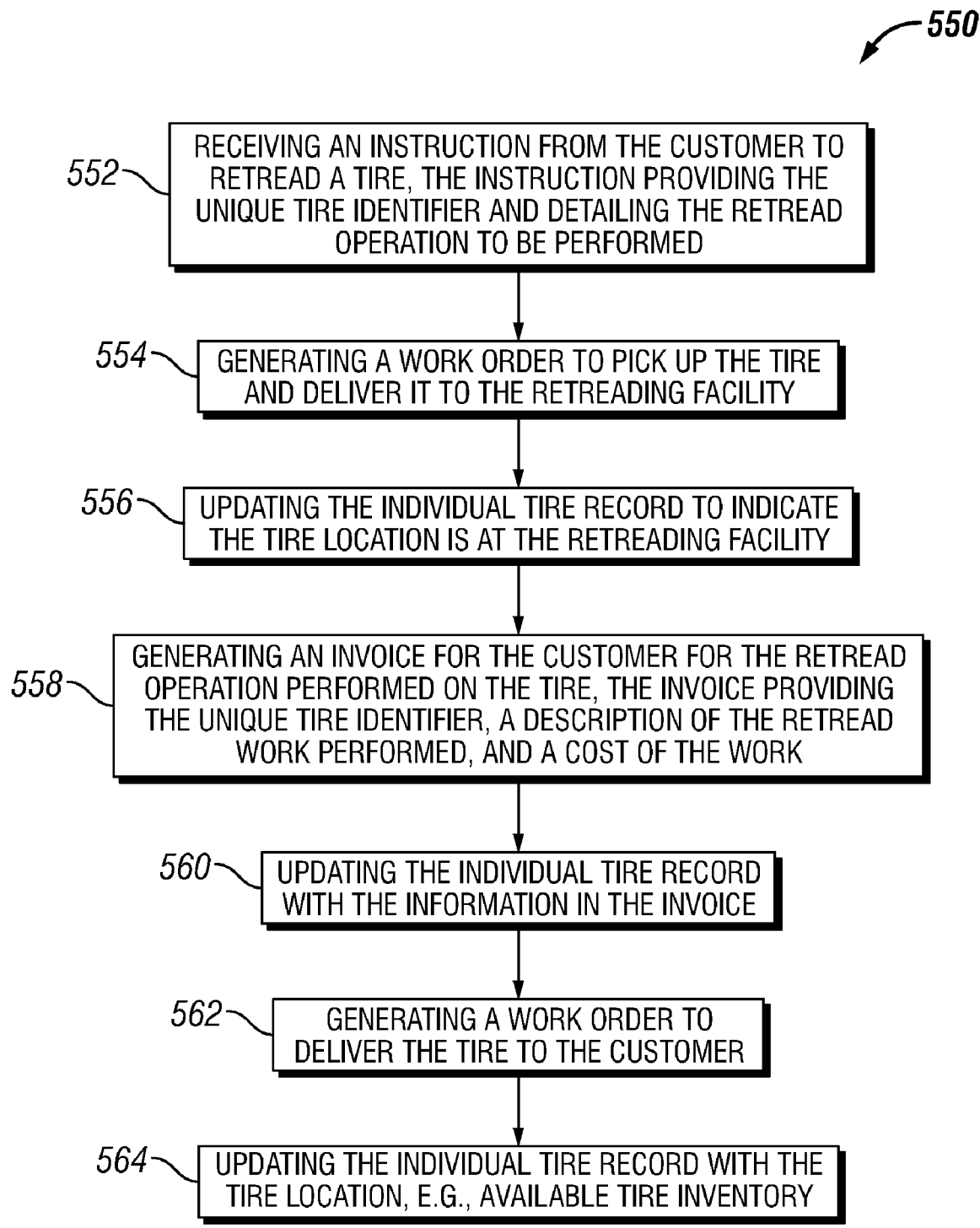
FIG. 11 is a flow chart of an exemplary embodiment that includes a updating an individual tire record with certain information upon the tire being retreaded.

FIG. 11 is a flow chart of an exemplary embodiment that includes a updating an individual tire record with certain information upon the tire being retreaded. In a particular embodiment, a tire is monitored from the time it is shipped to the retread shop, through the retread operation and returned to the truck yard.

In block 552, the system receives an instruction from the customer to retread a tire, the instruction providing the unique tire identifier and detailing the retread operation to be performed. An example of such detail would include the selection of the retread tread to bond to the buffed tire carcass during the retread process. During the retread process, the old tread is buffed off the tire carcass and a new retread tread is selected for bonding onto the tire carcass. In a particular embodiment, for example, such a request may be sent by the client 14 over the Internet 28 to the web server 32, which would then send the request to the manufacturing server 36.

In block 554, the system generates a work order to pick up the tire and deliver it to the retreading facility. In block 556, the individual tire record is updated to indicate the tire location is at the retreading facility.

In block 558, an invoice is generated BY POINT OF SALE SERVER for the retread work performed on the tire. The invoice may include, for example, the unique tire identifier, the retread tread installed on the tire carcass, the cost of the retreading work. In block 560, the individual tire record is updated to include, for example, the information in the invoice.

In block 562, a work order is generated to deliver the tire back to the customer. The work order would provide, for example, the unique tire identifier and the shipping address. In block 564, the system updates the individual tire record to record the new location of the tire, e.g., the available tire inventory.

Figure 12:
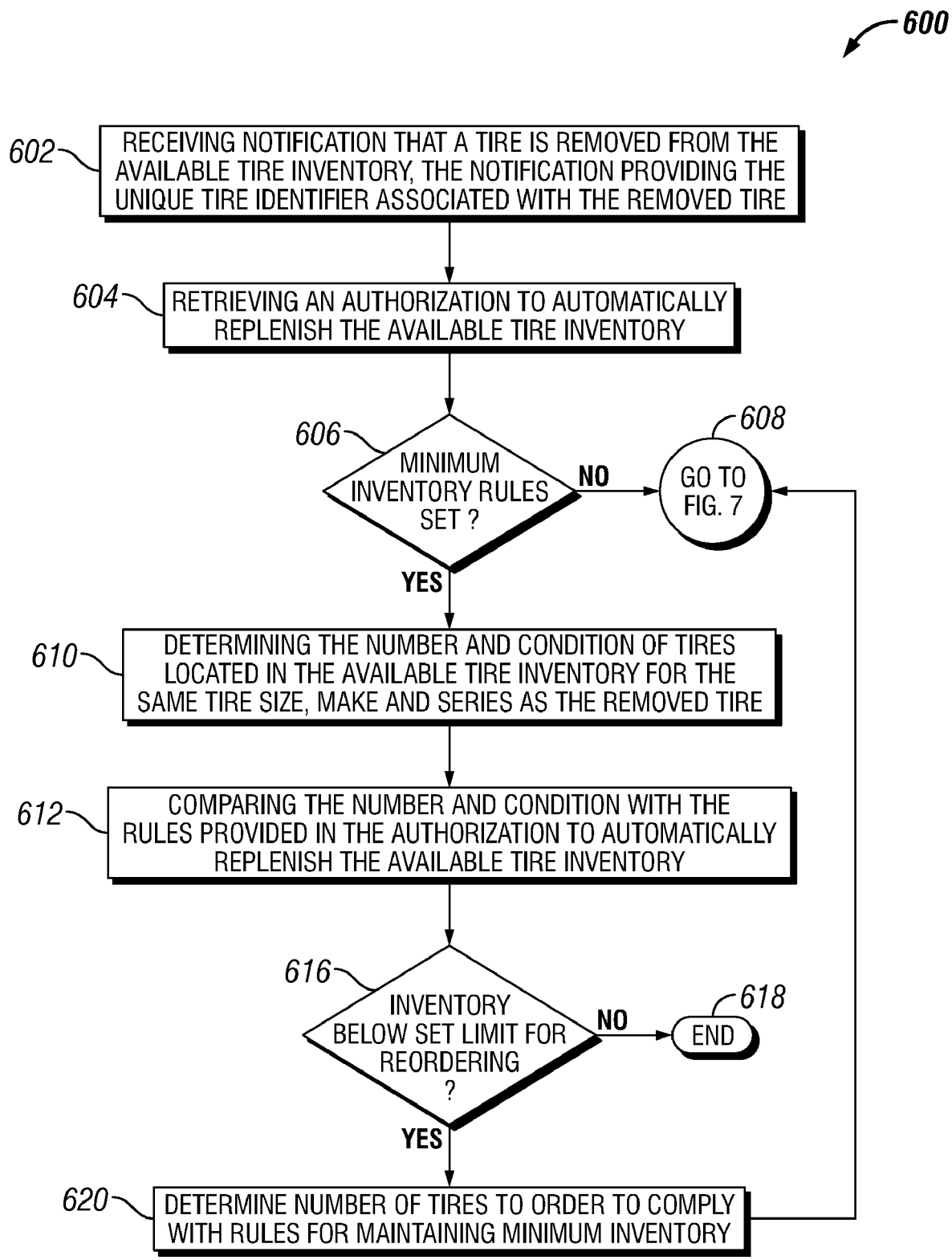
FIG. 12 is a flow chart of an exemplary embodiment that includes automatically replenishing an available tire inventory.

FIG. 12 is a flow chart of an exemplary embodiment that includes automatically replenishing an available tire inventory. In a particular embodiment, the available tire inventory may be maintained automatically at a preset level. In the exemplary embodiment, in block 602, a notice that a tire has been removed from the available tire inventory is received, for example, from the client 14 to the web server 32, which passes the notification on to the tire management server 42. The notification may provide, for example, the unique tire identifier associated with the removed tire. Such a notification may be, for example, contained in the mount notification described in FIG. 8 if the tire being mounted were taken from the available tire inventory.

In block 604, the system, for example the tire management server 42, retrieves an authorization to automatically replenish the available tire inventory to a predetermined level. In block 606, it is determined whether the rules authorize a one-for-one replacement or whether the rules require the inventory to drop below a certain level before new tires are ordered.

If, in block 606, it is determined that the rules authorize one-for-one replacement and that there is no minimum inventory rule set, the process advances to block 404 of FIG. 7 wherein a delivery instruction for the new replacement tire is generated and the process continues from there as previously shown in FIG. 7.

If in block 606 it is determined that a minimum inventory rule is set, then in block 610, the number and condition is determined of tires located in the available inventory having the same tire size, make and series as the removed tire. In block 610, the number and condition set in the rules for the minimum number of tires to be maintained in the invention is compared with the determined number of tires in the inventory.

If in block 616 it is determined that the inventory is not below the preset level, then in block 618, the process ends. If in block 616 it is determined that the inventory is below the preset level, then in block 620 it is determined how many new tires should be ordered to bring the inventory level up to minimum maintained level. Then, in block 608, the process advances to block 404 of FIG. 7 as previously discussed.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention. Ranges that are described as being "between a and b" are inclusive of the values for "a" and "b."

It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

What is claimed is:

1. A method in a data processing system for managing each of a plurality of tires from procurement through disposal, the method comprising:
   recording a unique tire identifier for each of the plurality of tires, wherein the unique tire identifier provides a singular unit identification for each of the plurality of tires;
   maintaining an individual tire record for each of the tires, wherein the individual tire record comprises the unique tire identifier, a tire description record, a tire location record and a tire usage record;
   maintaining a set of tire mounting rules for a vehicle type, the vehicle mounting rules providing permissible tire criteria for each mounting position for the vehicle type, wherein the permissible tire criteria comprises a permissible tire size, a permissible tire make, a permissible tire series and a permissible set of tire conditions;
   receiving a mount notification for one of the tires, the mount notification comprising the unique tire identifier for the tire being mounted on a vehicle, a unique vehicle identifier for the vehicle and a mounting position on the vehicle, the mounting position defined by an axle and a wheel location on the axle;
   retrieving through the data processing system the tire size, the tire make, the tire series and a set of tire mounting conditions from the individual tire record associated with the unique tire indicator of the tire being mounted;
   retrieving through the data processing system the vehicle type from an individual vehicle record associated with the unique vehicle identifier;
   retrieving through the data processing system the tire mounting rules for the vehicle type associated with the unique vehicle identifier;
   determining through the data processing system if the retrieved tire size, the tire make, the tire series and a set of tire mounting conditions from the individual tire record comply with the retrieved mounting rules;
   sending a notice of permission if the retrieved tire size, the tire make, the tire series and a set of tire mounting conditions from the individual tire record comply with the retrieved mounting rules.

2. The method of claim 1, wherein the individual tire record further comprises a tire cost record.

3. The method of claim 1, further comprising:
   maintaining a set of customer instructions for automatically filling an available tire inventory with replenishment tires if the available tire inventory falls below a predetermined number of available tires;
   searching the individual tire records for tires located in the available tire inventory;
   comparing through the data processing system a number of tires located in the available tire inventory with the predetermined number of available tires;
   providing a delivery instruction for the replenishment tires, the delivery instruction comprising a shipping address and a unique tire identifier for each of the replenishment tires.

* * * * *